United States Patent Office 2,723,241
Patented Nov. 8, 1955

2,723,241

PROCESS FOR BREAKING PETROLEUM EMULSIONS

Melvin De Groote, University City, and Kwan-Ting Shen, Brentwood, Mo., assignors to Petrolite Corporation, Wilmington, Del., a corporation of Delaware No Drawing. Application August 18, 1952,
Serial No. 305,080

17 Claims. (Cl. 252—344)

This invention relates to processes or procedures particularly adapted for preventing, breaking, or resolving emulsions of the water-in-oil type, particularly petroleum emulsions.

Complementary to the above aspect of our invention is our companion invention concerned with the new chemical products or compounds used as the demulsifying agents in said aforementioned processes or procedures, as well as the application of such chemical compounds, products and the like, in various other arts and industries, along with the method for manufacturing said new chemical products or compounds which are of outstanding value in demulsification. See our co-pending application, Serial No. 305,079, filed August 18, 1952.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts, from pipeline oil.

The present invention relates to a process for breaking petroleum emulsions of the water-in-oil type characterized by subjecting the emulsion to the action of a demulsified including synthetic hydrophile products; said synthetic hydrophile products herein described are illustrated, although not necessarily in the broadest sense, by reaction products of: (A) a monomeric nitrogen-containing compound containing at least one active hydrogen atom, and (B) phenolic epoxides being principally polyepoxides, including particularly phenolic diepoxides, said epoxides being free from reactive functional groups other than epoxy and hydroxyl groups; and including additionally cogenerically associated compounds formed in the preparation of said polyepoxides and particularly diepoxides; said epoxides being monomers and low molal polymers not exceeding the tetramers. The epoxides which are used are those containing at least 2 phenolic nuclei which are joined either directly or by a bridge radical such as a ketone residue or an aldehyde residue, formed by elimination of the carbonyl oxygen, the divalent radical

the carbonyl radical, the dilvalent sulfone radical, the divalent monosulfide radical, the divalent radical

—CH$_2$SCH$_2$— and the divalent disulfide radical —S—S—. In such epoxides, the phenolic portion is obtained from a phenol of the structure

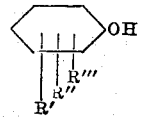

in which R', R" and R''' represent hydrogen or hydrocarbon substituents on the nucleus, such substituents having not over 18 carbon atoms. The compounds used to form the reaction products used in the practice of the present invention are non-thermosetting organic solvent-soluble liquids and low-melting solids and the reaction products themselves are oxyalkylation susceptible solvent-soluble liquids or low-melting solids.

In preparing diepoxides or the low molal polymers one does usually obtain cogeneric materials which may include monoepoxides. However, the cogeneric mixture is invariably characterized by the fact that there is on the average, based on the molecular weight, of course, more than one epoxide group per molecule.

Of particular importance are the products obtained from the compound of the formula

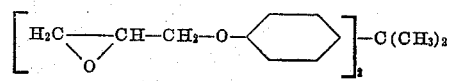

and the cogenerically associated compounds formed in its production.

It so happens that the bulk of information concerned with the preparation of compounds having two oxirane rings appears in the patent literature and for the most part in the recent patent literature. Thus, in the subsequent text, there are numerous references to such patents for purpose of supplying information and also for purpose of brevity.

Not withstanding the fact that subsequent data will be presented in considerable detail, yet the description becomes somewhat involved and certain facts should be kept in mind. The epoxides, and particularly the diepoxides may have no connecting bridge between the phenolic nuclei as in the case of a diphenyl derivative or may have a variety of connecting bridges, i. e., divalent linking radicals. Our preference is that either diphenyl compounds be employed or else compounds where the divalent link is obtained by the removal of a carbonyl oxygen atom as derived from a ketone or aldehyde.

If it were not for the expense involved in preparing and purifying the monomer we would prefer it to any other form, i. e., in preference to the polymer or mixture of polymer and monomer.

Stated another way we would prefer to use materials of the kind described, for example in U. S. Patent 2,530,353, dated November 14, 1950. Said patent describes compounds having the general formula

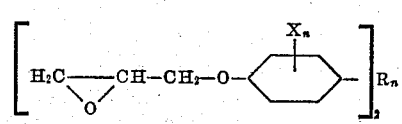

wherein R is an aliphatic hydrocarbon bridge, each $n$ independently has one of the values 0 and 1, and X is an alkyl radical containing from 1 to 4 carbon atoms.

The list of patents hereinafter referred to in the text is as follows:

| U. S. Patent No. | Dated | Inventor |
| --- | --- | --- |
| 2,122,953 | July 5, 1939 | Schafer. |
| 2,139,766 | December 13, 1938 | Mikeska et al. |
| 2,174,248 | Sept. 26, 1939 | Do. |
| 2,181,929 | December 5, 1939 | Werntz. |
| 2,195,539 | April 2, 1940 | Mikeska, et al. |
| 2,207,719 | July 16, 1940 | Cohen et al. |
| 2,243,329 | May 27, 1940 | De Groote et al. |
| 2,244,021 | June 3, 1941 | Rosen et al. |
| 2,246,321 | June 17, 1941 | Rosen. |
| 2,285,563 | June 9, 1942 | Britton et al. |
| 2,318,729 | May 11, 1943 | Wilson. |
| 2,325,514 | July 27, 1943 | Hester. |
| 2,330,222 | Sept. 28, 1943 | Kuhn et al. |
| 2,352,552 | June 27, 1944 | Kienzle. |
| 2,356,656 | August 22, 1944 | Chwala. |
| 2,369,818 | February 20, 1945 | De Groote et al. |
| 2,396,097 | March 5, 1946 | Gubelmann. |
| 2,410,911 | November 12, 1946 | Wasson et al. |
| 2,430,002 | November 4, 1947 | De Groote et al. |
| 2,457,329 | December 28, 1948 | Swern et al. |
| 2,457,634 | do | Bond et al. |
| 2,457,640 | do | Bruson. |
| 2,462,047 | February 15, 1949 | Wyler. |
| 2,462,048 | do | Do. |
| 2,466,517 | April 5, 1949 | Blair et al. |
| 2,468,163 | April 26, 1949 | Do. |
| 2,470,829 | May 24, 1949 | Monson. |
| 2,482,748 | September 27, 1949 | Dietzler. |
| 2,488,134 | November 15, 1949 | Mikeska et al. |
| 2,489,672 | November 29, 1949 | Revukas. |
| 2,494,295 | January 10, 1950 | Greenlee. |
| 2,499,365 | March 7, 1950 | De Groote et al. |
| 2,503,196 | April 4, 1950 | Dietzler et al. |
| 2,504,064 | April 11, 1950 | Bock et al. |
| 2,506,486 | May 2, 1950 | Bender et al. |
| 2,515,906 | July 18, 1950 | Stevens et al. |
| 2,515,907 | do | Do. |
| 2,515,908 | do | Do. |
| 2,520,093 | August 22, 1950 | Gross. |
| 2,526,545 | October 17, 1950 | Dietzler. |
| 2,530,353 | November 14, 1950 | Havens. |
| 2,552,530 | May 15, 1951 | De Groote. |
| 2,553,696 | May 22, 1951 | Wilson. |
| 2,564,191 | August 14, 1951 | De Groote et al. |
| 2,571,119 | October 16, 1951 | Do. |
| 2,575,558 | November 20, 1951 | Newey et al. |
| 2,577,256 | December 4, 1951 | Lundsted. |
| 2,581,919 | January 8, 1952 | Albert. |
| 2,581,464 | do | Zech. |
| 2,582,985 | January 22, 1952 | Greenlee. |

The new products herein described are useful for a number of purposes other than the resolution of petroleum emulsions. See our co-pending application Serial No. 305,079, filed August 18, 1952.

The compounds having two oxirane rings and employed for combination with the reactive amine, such as triethanolamine, are characterized by being a member of the class consisting of (A) compounds of the following formula:

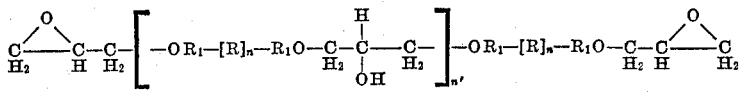

in which R represents a divalent radical selected from the class consisting of ketone residues formed by the elimination of the ketonic oxygen atom and aldehyde residues obtained by the elimination of the aldehydic oxygen atom, the divalent radical

the divalent

radical, the divalent sulfone radical, and the divalent monosulfide radical —S—, the divalent radical

and the divalent disulfide radical —S—S—; and $R_1O$ is the divalent radical obtained by the elimination of a hydroxyl hydrogen atom and a nuclear hydrogen atom from the phenol

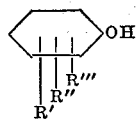

in which R', and R", and R''' represent a member of the class consisting of hydrogen and hydrocarbon substituents of the aromatic nucleus, said substituent member having not over 18 carbon atoms; n represents an integer selected from the class of zero and 1, and n' represents a whole number not greater than 3; and (B) cogenerically associated compounds formed in the preparation of (A) preceding, with the proviso that said compounds (A) and (B) be thermoplastic and organic solvent-soluble. Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with amine. In such instances, of course, the solvent selected would have to be one which is not susceptible to oxyalkylation, as for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxybutane (1,2,3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resin-

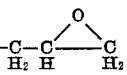

ous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed towards products which are not resins and have certain solubility characteristics not inherent in resins. Note, for example, that said U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin. The intent in the present instance in a comparable example would be to use a sulfonamide (not a sulfonamide resin) and obtain a material which does not have the characteristics of an ordinary varnish resin or the like, i. e., is permanently soluble, and stays soluble generally as a liquid of ordinary viscosity, or as a thick viscous liquid and may be a thermoplastic solid, and additionally even may be water-soluble.

Having obtained a reactant having generally 2 epoxy rings as depicted in the last formula preceding, or low molal polymers thereof, it becomes obvious the reaction can take place with any one of a number of mono-amines or polyamines which are oxyalkylation - susceptible. There is available considerable literature, particularly patent literature, dealing with oxyalkylation-susceptible amines or simple derivatives thereof, such as the esters of hydroxylated amines, for instance, higher fatty acid esters of triethanolamine and the like. Reference is made to such literature for a list of a large number of suitable reactants which do not require detailed description, although a rather comprehensive number of examples appear subsequently.

To illustrate the products which represent the subject matter of the present invention reference will be made to a reaction involving a mole of the oxyalkylating agent, i. e., the compound having two oxirane rings and triethanolamine. Proceeding with the example previously described it is obvious the reaction ratio of two moles of the amine to one mole of the oxyalkylating agent gives a product which may be indicated as follows:

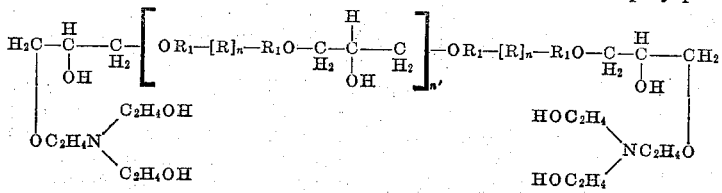

in which the various characters have their prior significance. However, molal ratios may be varied as noted subsequently.

Such final product in turn also must be soluble but solubility is not limited to an organic solvent but may include water or, for that matter, a solution of water containing an acid such as hydrochloric acid, acetic acid, hydroxyacetic acid, etc. In other words, the nitrogen groups present, whether one or more, may or may not be significantly basic and it is immaterial whether aqueous solubility represents the anhydro base or the free base (combination with water) or a salt form such as the acetate, chloride, etc. The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or are distinctly soluble in 5% acetic acid. For instance, the products freed from any solvent can be shaken with five to twenty times their weight of distilled water at ordinary temperature and are at least self-dispersing, and in many instances water-soluble, in fact, colloidally soluble. This is particularly true when there happens to be one or more nitrogen atoms present or a repetitious ether linkage as in the case of oxyethylated or oxypropylated monoamines or polyamines.

Speaking of oxyethylation and oxypropylation, it goes without saying that all of the products obtained from any of the nitrogenous containing reactants are in turn again oxyalkylation-susceptible and valuable derivatives can be obtained by further reaction with ethylene oxide, propylene oxide, ethylene imine, etc.

Similarly, derivatives can be obtained by use of a product having both a nitrogen group and a 1,2-epoxy group, such as 3-dialkylaminoepoxypropane. See U. S. Patent No. 2,520,093, dated August 22, 1950, to Gross.

For purpose of convenience what is said hereinafter will be divided into six parts with Part 3, in turn, being divided into three subdivisions.

Part 1 is concerned with our preference in regard to the polyepoxide and particularly the diepoxide reactant;

Part 2 is concerned with certain theoretical aspects of diepoxide preparation;

Part 3, Subdivision A, is concerned with the preparation of monomeric diepoxides, including Table I;

Part 3, Subdivision B, is concerned with the preparation of low molal polymeric epoxides or mixtures containing low molal polymeric epoxides as well as the monomer and includes Table II.

Part 3, Subdivision C, is concerned with miscellaneous phenolic reactants suitable for diepoxide preparation;

Part 4 is concerned with suitable nitrogen-containing compounds to be employed for reaction with the epoxides;

Part 5 is concerned with the reactions involving the two preceding types of materials and examples obtained by such reaction; and Part 6 is concerned with the resolution of petroleum emulsions of the water-in-oil type by means of the previously-described chemical compounds or reaction products.

PART 1

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a co-generic mixture as explained subsequently. Preparation of the monomer or separation of the monomer from the remaining mass of the co-generic mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

The phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for the major component of bis-phenol A is:

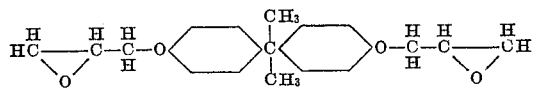

Lesser quantities of the 2,2' and 4,2' isomers are present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. If a product such as bis-phenol A is employed as the ultimate compound in monomeric form employed as a reactant in the present invention has the structure given above.

Treatment with epichlorohydrin, for example, does not yield this product initially but there is an intermediate produced which can be indicated by the following structure:

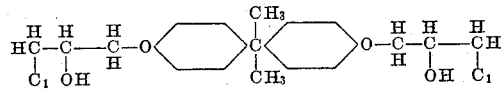

Treatment with alkali, of course, forms the epoxy ring. A number of problems are involved in attempting to produce this compound free from cogeneric materials of related composition. The difficulty stems from a number of sources and a few of the more important ones are as follows:

(1) The closing of the epoxy ring involves the use of caustic soda or the like which, in turn, is an effective catalyst in causing the ring to open in an oxyalkylation reaction.

Actually, what may happen for any one of a number of reasons is that one obtains a product in which there is only one epoxide ring and there may, as a matter of fact, be more than one hydroxyl radical as illustrated by the following compounds:

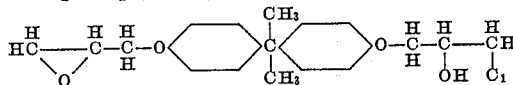

or

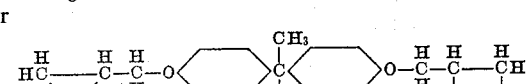

(2) Even if one starts with the reactants in the preferred ratio, to wit, two parts of epichlorohydrin to one part of bis-phenol A, they do not necessarily so react and as a result one may obtain products in which more than two epichlorohydrin residues becomes attached to a single bis-phenol A nucleus by virtue of the reactive hydroxyls present which enter into oxyalkylation reactions rather than ring closure reactions.

(3) As is well known, ethylene oxide in the presence of alkali, and for that matter in the complete absence of water, forms cyclic polymers. Indeed, ethylene oxide can produce a solid polymer. This same reaction can, and at times apparently does, take place in connection with compounds having one, or in the present instance, two substituted oxirane rings, i. e., substituted 1,2 epoxy rings. Thus, in many ways it is easier to produce a polymer, particularly a mixture of the monomer, dimer and trimer, than it is to produce the monomer alone.

(4) As has been pointed out previously, monoepoxides may be present and, indeed, are almost invariably and inevitably present when one attempts to produce polyepoxides, and particularly diepoxides. The reason is the one which has been indicated previously, together with the fact that in the ordinary course of reaction a diepoxide may react with a mole of bis-phenol A to give a monoepoxy structure. Indeed, in the subsequent text immediately following reference is made to the dimers, trimers and tetramers in which two epoxide groups are present. Needless to say, compounds can be formed which correspond in every respect except that one terminal epoxide group is absent and in its place is a group having one chloride atom and one hydroxyl group, or else two hydroxyl groups, or an unreacted phenolic ring.

(5) Some reference has been made to the presence of a chlorine atom and although all effort is directed towards the elimination of any chlorine-containing molecule yet it is apparent that this is often an ideal approach rather than a practical possibility. Indeed, the same sort of reactants are sometimes employed to obtain products in which intentionally there is both an epoxide group and a chlorine atom present. See U. S. Patent No. 2,581,464, dated January 8, 1952, to Zech.

What has been said in regard to the theoretical aspect is, of course, closely related to the actual method of preparation which is discussed in greater detail in Part 3, particularly Subdivisions A and B. There can be no clear line between the theoretical aspect and actual preparative steps.

For purpose of brevity, without going any further, the next formula is in essence one which, perhaps in an idealized way, establishes the composition of resinous products available under the name of Epon Resins as now sold in the open market. See, also, chemical pamphlet entitled "Epon Surface-Coating Resins," Shell Chemical Corporation, New York city. The word "Epon" is a registered trademark of the Shell Chemical Corporation.

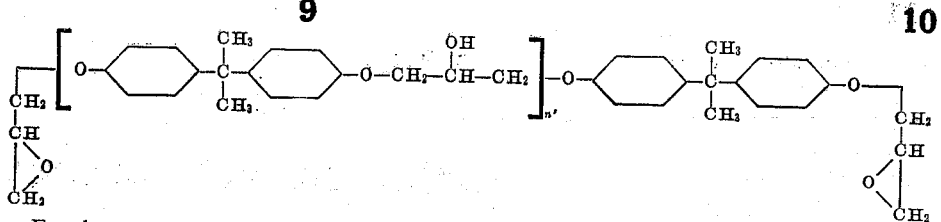

For the purpose of the instant invention, $n'$ may represent a number including zero, and at the most a low number such as 1, 2 or 3. This limitation does not exist in actual efforts to obtain resins as differentiated from the herein described soluble materials. It is quite probable that in the resinous products as marketed for coating use the value of $n'$ is usually substantially higher. Any formula is, at best, an over-simplification, or at the most represents perhaps only the more important or principal constituent or constituents. These materials may vary from simple non-resinous to complex resinous epoxides which are polyether derivatives of polyhydric phenols containing an average of more than one epoxide group per molecule and free from functional groups other than epoxide and hydroxyl groups.

PART 3

Subdivision A

The preparation of the diepoxy derivatives of the diphenols, which are sometimes referred to as diglycidyl ethers, have been described in a number of patents. For convenience, reference will be made to two only, to wit, aforementioned U. S. Patent 2,506,486, and aforementioned U. S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example Number | Diphenol | Diglycidyl Ether | Patent Reference |
|---|---|---|---|
| 1A | $CH_2(C_6H_4OH)_2$ | di(epoxypropoxyphenyl) methane | 2,506,486 |
| 2A | $CH_3CH(C_6H_4OH)_2$ | di(epoxypropoxyphenyl) methylmethane | 2,506,486 |
| 3A | $(CH_3)_2C(C_6H_4OH)_2$ | di(epoxypropoxyphenyl) dimethylmethane | 2,506,486 |
| 4A | $C_2H_5C(CH_3)(C_6H_4OH)_2$ | di(epoxypropoxyphenyl) ethylmethylmethane | 2,506,486 |
| 5A | $(C_2H_5)_2C(C_6H_4OH)_2$ | di(epoxypropoxyphenyl) diethylmethane | 2,506,486 |
| 6A | $CH_3C(C_3H_7)(C_6H_4OH)_2$ | di(epoxypropoxyphenyl) methylpropylmethane | 2,506,486 |
| 7A | $CH_3C(C_6H_5)(C_6H_4OH)_2$ | di(epoxypropoxyphenyl) methylphenylmethane | 2,506,486 |
| 8A | $C_2H_5C(C_6H_5)(C_6H_4OH)_2$ | di(epoxypropoxyphenyl) ethylphenylmethane | 2,506,486 |
| 9A | $C_3H_7C(C_6H_5)(C_6H_4OH)_2$ | di(epoxypropoxyphenyl) propylphenylmethane | 2,506,486 |
| 10A | $C_4H_9C(C_6H_5)(C_6H_4OH)_2$ | di(epoxypropoxyphenyl) butylphenylmethane | 2,506,486 |
| 11A | $(CH_3C_6H_4)CH(C_6H_4OH)_2$ | di(epoxypropoxyphenyl) tolylmethane | 2,506,486 |
| 12A | $(CH_3C_6H_4)C(CH_3)(C_6H_4OH)_2$ | di(epoxypropoxyphenyl) tolylmethylmethane | 2,506,486 |
| 13A | Dihydroxy diphenyl | 4,4'-bis(2,3-epoxypropoxy) diphenyl | 2,530,353 |
| 14A | $(CH_3)C(C_4H_5.C_6H_5OH)_2$ | 2,2-bis(4-(2,3-epoxypropoxy) 2-tertiarybutylphenyl)) propane. | 2,530,353 |

Subdivision B

As to the preparation of low-molal polymeric epoxides or mixtures reference is made to numerous patents and particularly the aforementioned U. S. Patents Nos. 2,575,558 and 2,582,985.

To the extent that one can propose a formula, even though it is an over-simplified idealization, it appears extremely desirable to include specific reference to aforementioned U. S. Patent No. 2,575,558. The reason is that this patent includes the same formula which has been referred to previously in Part 2, which is concerned with the theoretical aspects of diepoxide preparation. Furthermore, this formula, or its counterpart, appears in the hereto appended claims.

The following examples are specified by reference to the formula, but it must be borne in mind that this represents an over-simplification.

TABLE II

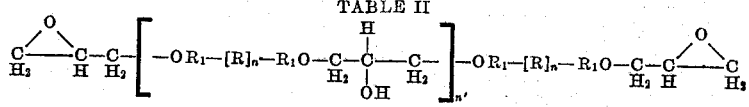

(in which the characters have their previous significance)

| Example Number | $-R_1O-$ from $HR_1OH$ | $-R-$ | $n$ | $n'$ | Remarks |
|---|---|---|---|---|---|
| B1 | Hydroxybenzene | $\begin{array}{c}CH_3\\|\\-C-\\|\\CH_3\end{array}$ | 1 | 0,1,2 | Phenol known as bis-phenol A. Low polymeric mixture about 2/3 or more where $n'=0$, remainder largely where $n'=1$, some where $n'=2$. |
| B2 | do | $\begin{array}{c}CH_3\\|\\-C-\\|\\CH_2\\|\\CH_3\end{array}$ | 1 | 0,1,2 | Phenol known as bis-phenol B. See note regarding B1 above. |
| B3 | Orthobutylphenol | $\begin{array}{c}CH_3\\|\\-C-\\|\\CH_3\end{array}$ | 1 | 0,1,2 | Even though $n'$ is preferably 0, yet the usual reaction product might well contain materials where $n'$ is 1, or to a lesser degree 2. |
| B4 | Orthoamylphenol | $\begin{array}{c}CH_3\\|\\-C-\\|\\CH_3\end{array}$ | 1 | 0,1,2 | Do. |

TABLE II—Continued
(in which the characters have their previous significance)

| Example Number | $-R_1O-$ from $HR_1OH$ | $-R-$ | $n$ | $n'$ | Remarks |
|---|---|---|---|---|---|
| B5 | Orthooctylphenol | $-C(CH_3)_2-$ | 1 | 0,1,2 | Even though $n'$ is preferably 0, yet the usual reaction product might well contain materials where $n'$ is 1, or to a lesser degree 2. |
| B6 | Orthononylphenol | $-C(CH_3)_2-$ | 1 | 0,1,2 | Do. |
| B7 | Orthododecyl | $-C(CH_3)_2-$ | 1 | 0,1,2 | Do. |
| B8 | Metacresol | $-C(CH_3)_2-$ | 1 | 0,1,2 | See prior note. This phenol used as initial material is known as bis-phenol C. For other suitable bis-phenols see U. S. Patent 2,564,191. |
| B9 | ....do.... | $-C(CH_3)(CH_2CH_3)-$ | 1 | 0,1,2 | See prior note. |
| B10 | Dibutyl (ortho-para) phenol | $-CH_2-$ | 1 | 0,1,2 | Do. |
| B11 | Diamyl (ortho-para) phenol | $-CH_2-$ | 1 | 0,1,2 | Do. |
| B12 | Dioctyl (ortho-para) phenol | $-CH_2-$ | 1 | 0,1,2 | Do. |
| B13 | Dinonyl (ortho-para) | $-CH_2-$ | 1 | 0,1,2 | Do. |
| B14 | Diamyl (ortho-para) | $-CH(CH_3)-$ | 1 | 0,1,2 | Do. |
| B15 | ....do.... | $-CH(C_2H_5)-$ | 1 | 0,1,2 | Do. |
| B16 | Hydroxy benzene | $-SO_2-$ | 1 | 0,1,2 | Do. |
| B17 | Diamyl phenol (ortho-para) | $-S-S-$ | 1 | 0,1,2 | Do. |
| B18 | ....do.... | $-S-$ | 1 | 0,1,2 | Do. |
| B19 | Dibutyl phenol (ortho-para) | $-CH_2-CH_2-$ | 1 | 0,1,2 | Do. |
| B20 | ....do.... | $-CH_2-CH_2-$ | 1 | 0,1,2 | Do. |
| B21 | Dinonyl phenol (ortho-para) | $-CH_2-CH_2-$ | 1 | 0,1,2 | Do. |
| B22 | Hydroxy benzene | $-C(=O)-$ | 1 | 0,1,2 | Do. |
| B23 | ....do.... | None | 0 | 0,1,2 | Do. |
| B24 | Ortho-isopropyl | $-C(CH_3)_2-$ | 1 | 0,1,2 | See prior note. As to preparation of 4,4'-isopropylidene bis-(2-isopropylphenol) see U. S. Patent No. 2,482,748, dated Sept. 27, 1949, to Dietzler. |
| B25 | Para-octyl | $-CH_2-S-CH_2-$ | 1 | 0,1,2 | See prior note. (As to preparation of the phenol sulfide see U. S. Patent No. 2,488,134, dated Nov. 15, 1949, to Mikeska et al.). |
| B26 | Hydroxy-benzene | $-C(CH_3)(CH_2OC_2H_5)-$ | 1 | 0,1,2 | See prior note. As to preparation of the phenol sulfide see U. S. Patent No. 2,526,545. |

Subdivision C

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei. For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substituents are usually in the ortho position and may be illustrated by a phenol of the following composition:

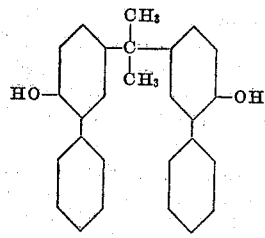

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other examples include:

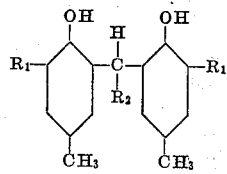

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups, and wherein said alkyl group contains at least 3 carbon atoms. See U. S. Patent No. 2,515,907.

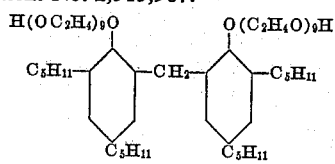

in which the —$C_5H_{11}$ groups are secondary amyl groups. See U. S. Patent No. 2,504,064.

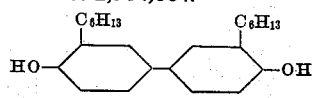

See U. S. Patent No. 2,285,563.

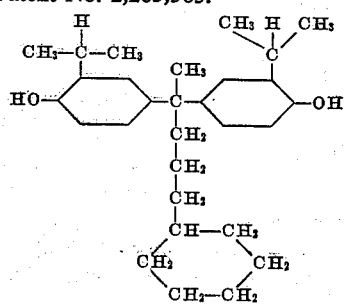

As to sulfides, the following compound is of interest:

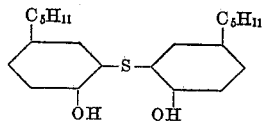

See U. S. Patent No. 2,331,448.

As to descriptions of various suitable phenol sulfides, reference is made to the following patents: U. S. Patents Nos. 2,246,321, 2,207,719, 2,174,248, 2,139,766, 2,244,021, and 2,195,539.

As to sulfones, see U. S. Patent No. 2,122,958.

As to suitable compounds obtained by the use of formaldehyde or some other aldehyde, particularly compounds such as

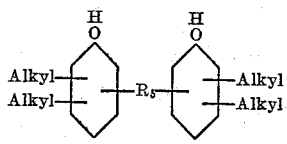

in which $R_5$ is a methylene radical, or a substituted methylene radical which represents the residue of an aldehyde and is preferably the unsubstituted methylene radical derived from formaldehyde. See U. S. Patent No. 2,430,002.

See also U. S. Patent No. 2,581,919 which describes di(dialkyl cresol) sulfides which include the monosulfides, the disulfides, and the polysulfides. The following formula represents the various dicresol sulfides of this invention:

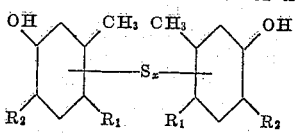

See U. S. Patent No. 2,503,196.

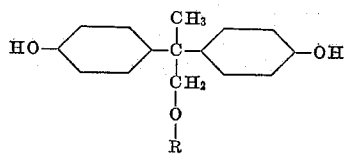

wherein R is a member of the group consisting of alkyl, and alkoxy-alkyl radicals containing from 1 to 5 carbon atoms, inclusive, and aryl and chloraryl radicals of the benzene series. See U. S. Patent No. 2,526,545.

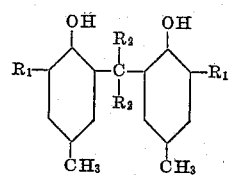

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U. S. Patent No. 2,515,906.

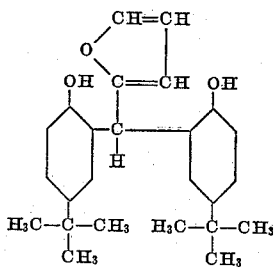

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfides. See U. S. Patent No. 2,515,908.

PART 4

As previously noted, Part 4 is concerned with the amino reactants employed in conjunction with the polyepoxide reactant usually containing two oxirane rings. Since the reactant described in detail in Part 3, preceding, is essentially an oxyalkylating agent it is obvious that any amino compound, and more broadly any nitrogen-containing compound such as an amide, which is oxyalkylation susceptible is suitable for the present purpose. In essence, this means that the product must have a labile hydrogen attached to either oxygen or nitrogen. Such hydrogen atom may be attached directly to a nitrogen atom as in the case of an amide, an amine, or the like. However, it may be attached directly to oxygen as in the case of triethanolamine; or a labile hydrogen atom in the form of a hydroxyl group may appear in the acyl radical of an amide or the ester of an amine, such as an ester of ethanoldiethyl amine; although ricinoleic acid exemplifies an acyl radical with a hydroxyl group which is somewhat reactive, yet more satisfactory, is a hydroxy carboxylic acid such as

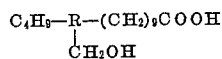

wherein R is a six-sided carbocycle of the formula $C_6H_9$, as described in U. S. Patent No. 2,457,640, dated December 28, 1948, to Bruson et al.

One need not necessarily use monoamino compounds or compounds containing a single nitrogen atom but may use polyamino compounds including, of course, compounds where there is more than one amide group. There is no limitation as to the group which is attached to the nitrogen atom insofar that it may be alkyl, aryl, alicyclic, and alkylaryl, arylalkyl, etc. Heterocyclic compounds such as morpholine may be employed. The amino compound or amido compound may be water-soluble or water-insoluble. The amine may contain a phenolic hydroxyl as, for example,

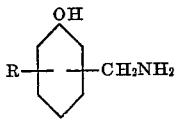

where R is an alkyl group generally having five carbon atoms or more. See U. S. Patent No. 2,410,911, dated November 12, 1946, to Wasson et al. Further examples appear in the subsequent text.

Needless to say, since it is specified that the amino compound or amido compound be oxyalkylation susceptible it can be subjected to reaction with some other alkylene oxide than the instant reactant containing the two oxirane rings, such as ethylene oxide, propylene oxide, butylene oxide, styrene oxide, glycide, glycidyl ethers of methanol, ethanol, propanol, phenol, and the like. The fact that such reactants are oxyalkylation susceptible means they are also susceptible to reaction with imines, such as ethyleneimine, propyleneimine, etc. Furthermore, any non-nitrogenous compound which is oxyalkylation susceptible, for instance, an alcohol or a phenol, may be reacted with ethyleneimine to give suitable compounds to be employed as reactants in the present procedure. See, for example, U. S. Patent No. 2,318,729, dated May 11, 1943, to Wilson. This same procedure, of course, described in said Wilson patent can be used in conjunction with any alcohol or phenol. Indeed, water-soluble polymers of lower alkylene imines can be employed. See U. S. Patent No. 2,553,696, dated May 22, 1951, to Wilson. The imines may have ether linkages as previously noted. See, for example, the products described in U. S. Patent No. 2,325,514, dated July 27, 1943, to Hester.

As is obvious from what is said, one need not use organic compounds but inorganic compounds such as ammonia or hydrazine can be employed. In the case of amides, one is not limited to the amides of monocarboxy or polycarboxy acids but one may use sulfonamides or the amide of carbonic acid, i. e., urea. However, certain derivatives of urea appear more satisfactory than urea itself. See U. S. Patent No. 2,352,552, dated June 27, 1944, to Kienzle.

As to a variety of sulfonamides which are readily susceptible to oxyalkylation, particularly with ethylene oxide or propylene oxide, see U. S. Patent No. 2,577,256, dated December 4, 1951, to Lundsted. Such sulfonamide could be used as such or after treatment with one or more moles of ethylene oxide, propylene oxide, etc.

For purpose of convenience attention is directed to a sizable number of nitrogen-containing compounds which are available in the open market as differentiated from those which could be readily prepared by reaction with ethylene oxide, propylene oxide, ethyleneimine, etc. In some instances even these reactants, notwithstanding the fact that they do have a labile hydrogen atom, are more satisfactory after treatment with ethylene oxide so as to have the labile hydrogen atom attached to oxygen instead of nitrogen.

Amine 220 (Carbide and Carbon Chemicals Company, New York city, N. Y., designation for
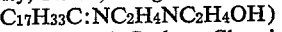

Amine 803 (Carbide and Carbon Chemicals Company, New York city, N. Y., designation for
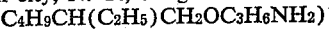

Ethyl amine
Diethyl amine
Isopropyl amine
Diisopropyl amine
n-Butyl amine
Dibutyl amine
n-Hexyl amine
2-ethylhexyl amine
Di(2-ethylhexyl) amine
Ethylene diamine
Diethylene triamine
Triethylene tetramine
Tetraethylene pentamine
Propylene diamine
N-hydroxyethyl propylene diamine

| | |
|---|---|
| N,N'-dihydroxyethyl ethylene diamine | N-butyl diethanolamine |
| 2,5-dimethyl piperazine | Aminoethyl ethanolamine |
| Morpholine | Di(2 - ethylhexyl) ethanolamine |
| N-hydroxyethyl morpholine | Tetraethanol ammonium hydroxide |
| N-aminoethyl morpholine | N-acetyl ethanolamine |
| N-aminopropyl morpholine | N,N-diethyl ethylene diamine |
| Monoethanolamine | Monoisopropanolamine |
| Diethanolamine | Diisopropanolamine |
| Triethanolamine | Triisopropanolamine |
| N-methyl ethanolamine | Dimethyl isopropanolamine |
| Dimethyl ethanolamine | Dibutyl isopropanolamine |
| N-ethyl ethanolamine | 1,3-diaminopropane |
| N-ethyl diethanolamine | 3-diethylaminopropylamine |
| N-methyl diethanolamine | 1,3-diaminobutane |
| n-Amylamine | 1,3-bis-ethylaminobutane |
| Di-n-amylamine | N-ethylbutylamine |
| Sec-amylamine | 2-amino-4-methylpentane |
| Hexylamine | 4-amino-2-butanol |
| Dihexylamine | 1 - dimethylamino - 2 - propanol |
| Heptylamine | |
| Octylamine | 5 - isopropylamino - 1 - pentanol |
| Dioctylamine | |
| Decylamine | N-butylaniline |
| Dodecylamine | |
| Diethyl ethanolamine | |

High molecular weight aliphatic amides known as Armid 8, Armid 10, Armid 12, Armid 14, Armid 16, Armid 18, Armid HT, Armid RO, Armid T, Armid TO and Armid C, as described in a chemical pamphlet entitled "Armids," issued by Armour Chemical Division, Chicago 9, Illinois.

Similarly, secondary high molecular weight aliphatic amines known as Armeen 2C and Armeen 2HT, as described in circular entitled "Secondary Armeens," as issued by Armour Chemical Division, Chicago, Illinois.

Also, high molecular weight aliphatic amines known as Armeen 10, Armeen 16D, Armeen HTD, Armeen 18D, and Armeen CD, as described in a pamphlet entitled "Armeens," issued by Armour Chemical Division, Armour and Company, Chicago, Illinois.

Included also are fatty diamines having both primary and secondary amine groups and sold under the name Duomeens, such as Duomeen T, as described in a circular entitled "Duomeen T" issued by Armour Chemical Division, Chicago, Illinois.

Other suitable amines are primary monoamines of the type $H(OC_2H_4)_nNH_2$, where $n=3$ to 5.

Suitable amines having an aromatic ring include alpha-methylbenzylamine, alpha - methylbenzylmonoethanolamine and alpha-methylbenzyl diethanolamine.

One may use tertiary alkyl primary amines such as tertiary-octylamine, alkylamine 81–R, alkylamine 81–T, alkylamine JM–R, and alkylamine JM–T. As to a description of these amines see Rohm & Haas Company, Philadelphia, Pa., pamphlet entitled "Tertiary-Alkyl Primary Amines."

Other amines include:

2-amino-2-methyl-1-propanol
    2-amino-2-methyl-1,3-propanediol
    2-amino-2-ethyl-1,3-propanediol
    3-amino-2-methyl-1-propanol
    2-amino-1-butanol
    3-amino-2,2-dimethyl-1-propanol
    2-amino-2,3-dimethyl-1-propanol
    2,2-diethyl-2-amino ethanol
    2,2-dimethyl-2-amino ethanol
    3-amino-1,2-butanediol
    4-amino-1,2-butanediol
    2-amino-1,3-butanediol
    4-amino-1,3-butanediol
    4,4-dimethyl-1,3-butanediol
    2-amino-1,4-butanediol
    3-amino-1,4-butanediol
    1-amino-2,3-butanediol
    Tris-(hydroxy methyl) amino methane An additional desirable group of amines are dialiphatic-aminoalkylcardanols, and particularly those having 10 to 40 carbon atoms in the dialiphatic grouping; examples include di-2-ethylhexylaminomethylcardanol, diamylaminomethyl cardanol, dilaurylaminoethyl cardanol, and di-n-butylaminomethyl cardanol. See U. S. Patent No. 2,489,672, dated November 29, 1949, to Revukas.

Further examples of this same type of material and which has available both a phenolic hydroxyl and an alkanol hydroxyl is illustrated by the condensation product derived from a phenol, either monofunctional or difunctional, such as para-tertiary butylphenol, para-tertiary amylphenol, octylphenol, nonylphenol, and similar phenols having a substituent such as two butyl groups or two nonyl groups in both an ortho and the para position. Such phenols are reacted with an aldehyde, such as formaldehyde, acetaldehyde, etc. and an alkanol phenol, such as diethanolamine, ethylethanolamine, dipropanolamine, and other amyl amines having only one amino hydrogen atom. See, for example, U. S. Patent No. 2,457,634, dated December 28, 1948, to Bond et al.

Amines having ring structures of course include aniline, diphenylamine, cyclohexylamine, dicyclohexylamine, and various comparable amines with alkyl substituents in the ring and similarly such amines after treatment with ethylene oxide, propylene oxide, glycide, etc.

It is to be noted, of course, that the above description in the text immediately preceding is largely miscellaneous in character because the reference is to products available in the open market. Practically every amine which is oxyalkylation susceptible is also acylation susceptible although there are some compounds, such as amides, sulfonamides, urea, etc., which are much more readily oxyalkylation susceptible than acylation susceptible for the reason that it is much more difficult to form a secondary amide, and more especially a tertiary amide, than it would be to react a primary amide with one or more moles of an alkylene oxide.

However, U. S. Patent No. 2,571,119, dated October 16, 1951, to De Groote et al., covers essentially the same compounds herein proposed, including imidazolines and oxyalkylated imidazolines. This patent divides the nitrogen compounds into a number of classes which is convenient, when one considers the reactions discussed in Part 5, succeeding.

In the following classes the amides, sulfonamides, ureas, etc., are omitted but suitable reference has been made to these previously. The inorganic nitrogen compounds include ammonia, hydrazine, etc. The organic nitrogen compounds include amines, such as primary, secondary and tertiary amines, polyamines as well as monoamines, amines containing alkanol radicals or the equivalent, and amines which contain both a reactive hydrogen atom attached to oxygen and one or more reactive hydrogen atoms attached to nitrogen. For purpose of convenience the nitrogen-containing compounds employable as reactants here are divided into the following classes.

*Class 1.*—Ammonia and hydrazine and compounds containing only one nitrogen atom per molecule with at least one reactive hydrogen atom attached thereto, but in the absence of reactive hydroxyl groups. Primary amines like ethylamine, isopropylamine, butylamine, amylamine, hexylamine, heptylamine, octylamine, decylamine, tetradecylamine, hexadecylamine, and octadecylamine are members of the class. High molal primary amines, like those sold by Armour & Company, Chicago, as "Armeens," usually with a figure designation showing the number of C atoms in the alkyl radical, e. g., "Armeen 10," "Armeen 12," "Armeen 16," etc., are included. So are secondary amines like diethylamine, dipropylamine, dibutylamine, diamylamine, dihexylamine, dioctylamine, etc. Also included are aniline, cyclohexylamine, bis-(dimethylbutyl)-amine, 1-3-dimethylbutylamine, 2-amyl-4-methyl pentane. Amides are also included in this class, but are commonly not attractive for use here because of the difficulty of securing satisfactory reaction to produce secondary amides. Other useful amines of this class will be suggested by the above-recited list.

*Class 2.*—Compounds containing only 1 nitrogen atom per molecule, but in which a hydroxyl group is the only reactive and functional group, as here employed. In this class are tertiary alkanolamines like diethylethanolamine, dimethylethanolamine, triethanolamine, diethylpropanolamine, methyldiethanolamine, ethyldipropanolamine, phenyldiethanolamine, etc. The products obtained by reacting such amines with alkylene oxides like ethylene oxide or propylene oxide are also useful, e. g., triethanolamine may be reacted with ethylene- or propylene oxide. Alkyl primary amines, particularly those in which the alkyl group originates in fatty materials and contains from about 10 to about 18 carbon atoms, may be treated with such alkylene oxides to produce useful nitrogen compounds of the generic formula, R—di(Alkoxy)$_n$H—N. Similarly, amides of the generic formula $RCONH_2$, may be oxyalkylated to produce compounds of the generic formula,

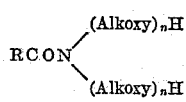

The ricinoleyl amides of dialkylamines are also examples of this class. Other examples of similarly useful reactants of this class will be suggested by the above list.

Class 3.—Compounds containing only 1 nitrogen atom per molecule and having, in addition to at least 1 reactive hydrogen atom attached thereto, also at least 1 reactive hydroxyl group. In this class are included monoethanolamine, diethanolamine, monopropanolamine, dipropanolamine, ethylethanolamine, propylethanolamine, ethylpropanolamine, phenylethanolamine, 2-amino-2-methyl-1-propanol, 4-amino-4 - methyl - 2 - pentanol, 4-amino-2-butanol 1-dimethylamino-2-propanol, 5-isopropylamino-1-pentanol, etc. The high-molal monocarboxy acid amides of monoalkanolamines are also examples of this class. Obvious equivalents will be suggested by the above list.

Class 4.—Esters of tertiary alkanolamines having only 1 nitrogen atom per molecule, to which nitrogen atom there are attached no reactive hydrogen atoms, but in which ester molecule there is at least 1 reactive hydroxyl radical, either attached to the nitrogen atom through a suitable divalent radical or else as a part of the acyl radical present in said ester. The acyl radicals are those found in monocarboxy acids having 8 C atoms or more. Examples of this class of nitrogen compound are the esters produced from oleic acid and ethyldiethanolamine or from ricinoleic acid and diethylethanolamine. In the case of the above oleic esters, esterification consumes only one of the two hydroxyl groups originally present in that alkanolamine, leaving one such reactive hydroxyl group in the ester, for use for the present purpose. In the case of the ricinoleic ester above, esterification consumes the only hydroxyl group originally present in the alkanolamine uesd; but the ricinoleic radical itself contains a reactive hydroxyl group, and the ester is therefore still reactive for the present purpose. In preparing the compounds of this kind, there may be employed only as many acyl radicals as there are alkanol radicals, less one; except that, if the acyl radical itself retains at least one reactive hydroxyl group after esterification, then one may use as many acyl radicals as there are alkanol radicals. Examples of suitable alkanolamines have already been recited under Class 2 above; but some of the examples there recited will not serve here in all cases because they contain only one reactive hydroxyl group and this is destroyed in esterification. If ricinoleic acid is the acylating reactant, all those recited there are useful here. It is apparent from the foregoing description that the intent is to retain at least one reactive hydroxyl group in the ester prepared from the tertiary alkanolamine and the acylating reactant employed.

Class 5.—Compounds which are non-resinous, which contain more than 1 nitrogen atom per molecule, and which contain no acyl group. Examples include the alkylene polyamines like ethylenediamine, diethylenetriamine, triethylene-tetramine, tetraethylenepentamine, propylenediamine, dipropylenetriamine, etc. These alkylene polyamines may be treated with an alkylene oxide like ethylene oxide or propylene oxide to produce derivatives which are also useful here, such as hydroxyethylethylenediamine, tetraethanoltetraethylenepentamine, etc. Oxyalkylation may be continued, of course, until a considerable number of alkyleneoxy groups have been introduced, without adversely affecting the utility of such derivatives here. Imidazolines, both monoimidazolines and di-imidazolines, are included in this present class. Such compounds may be prepared by reacting, under sufficiently severe conditions, a monocarboxylated acid and an alkylenepolyamine. For example, when oleic acid and tetraethylenepentamine are reacted in molar proportions at a temperature somewhat exceeding 200° C. amidification first occurs, with the elimination of 1 mole of water. On continued heating, especially at temperatures approaching 300° C. a second molecule of water is split out, the acyl group becomes an alkyl group, the imidazoline ring is formed, and the product is the monoleyl imidazoline of tetraethylenepentamine. If the proportion of fatty acid is doubled, a dioleyl imidazoline is produced, instead. Examples of such mono- and di-imidazolines are recited and described in U. S. Patents Nos. 2,466,517 and 2,468,163, dated April 5, 1949, and April 26, 1949, respectively, to Blair and Gross. Furthermore, U. S. Patent No. 2,369,818, dated February 20, 1945, to De Groote and Keiser, illustrates the fact that such imidazolines may be subjected to reaction with an alkylene oxide like ethylene oxide, to produce oxyalkylated derivatives thereof which are useful here.

Other examples of suitable reactants of the present class include 3-diethylaminopropylamine, 1-3-diaminobutane, triglycoldiamine, and the compound,

NH₂(CH₂)₃O(CH₂)₆O(CH₂)₃NH₂

See U. S. Patent No. 2,552,530, dated May 15, 1951, for additional examples of suitable nitrogen compounds of this class.

Class 6.—Compounds containing more than 1 basic nitrogen atom per molecule, and which also contain at least one high molal acyl group. The amides produced from monocarboxy acids like the fatty acids and alkylene polyamines like tetraethylenepentamine, and referred to in Class 5 above as being intermediates formed in the preparation of certain imidazolines, are representative of this class. For example, if one reacts 1 mole of oleic acid with 1 mole of tetraethylenepentamine until 1 mole of water of reaction is removed, the product is an amide of the present class. Stearic acid or tall oil or other detergent-forming acid having at least 8 C atoms may be substituted for oleic acid in producing such an amide, with equally satisfactory results. Other alkylene polyamines such as ethylenediamine, diethylenetriamine, triethylenetetramine, etc., may be substituted for tetraethylenepentamine in the examples just discussed, to produce desirable amides. Or such polyamine may be oxyalkylated prior to use in the amidification reaction, using ethylene oxide or propylene oxide. If imidazolines of the kind included in Class 5, immediately above, are acylated, such acylated imidazolines are then properly included in the present class of nitrogen compounds. Other useful examples of nitrogen compounds of the present class are described in U. S. Patent No. 2,243,329, dated May 27, 1940, to De Groote and Blair.

Of all the members of this sixth class of nitrogen compounds, we prefer to employ as reactants here a type of product which is related to the esters of Class 4 above. If, instead of using molal proportions of high molal monocarboxy acid having 8 carbon atoms or more and of tertiary alkanolamine, as in the preparation of materials of Class 4, above, one employs 2 or more moles of alkanolamine for every mole of monocarboxy acid, desirable reactants of the present class are formed. These may be termed acylated polyaminoalcohols. To describe more precisely this particular and preferred type of Class 6 nitrogen compound, the following statement is made.

The compounds are acylated derivatives of a basic polyaminoalcohol of the formula:

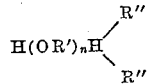

said acylated derivatives thereof being such that there is at least one occurrence of the radical RCO, which is the acyl radical of a monocarboxy detergent-forming acid having at least 8 and not more than 32 carbon atoms; the amino nitrogen atom is basic; R″ is a member of the class consisting of aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; and RCO is a substituent for a hydroxyl hydrogen atom.

In the foregoing formula, R' may, in some of its multiple occurrences in the molecule, represent the same alkylene radical or it may represent different alkylene radicals, so long as each R contains from 2 to 10 carbon atoms. For example, oxyethylated, oxypropylated triethanolamine would contain some R' radicals which are $C_2H_4$ radicals, and others which are $C_3H_7$ radicals.

Further description of the acylated polyaminoalcohol reactant will be found, for example, in U. S. Patent No. 2,470,829, dated May 24, 1949, to Monson.

It is to be understood that isomeric forms of the nitrogenous compounds of all 6 classes above may be employed instead of the forms referred to above, without departing from the invention.

Other amines, some of which are predominantly hydrophile and some of which are predominantly hydrophobe, also may be employed. Reference is made to previously mentioned U. S. Patents Nos. 2,181,929, 2,330,222, 2,356,565, 2,396,097 and 2,552,530. Examples of hydrophile amines include gulcamine and maltosamine.

Particular reference is made to aforementioned U. S. Patent No. 2,552,530, for the reason that it illustrates suitable amines in which the molecular weight may be as high as 4,000 to 10,000. Other amines may be obtained in a comparable fashion from monoamines as raw materials instead of polyamines as, for example, from triethanolamine. Similarly, types of materials can be obtained which are extremely hydrophile by oxyalkylation in the same manner using ethylene oxide or glycide. Generally speaking, however, it is our preference that the nitrogen-containing reactant has a molecular weight of less than 3,000 and generally less than 1,800.

PART 5

As has been pointed out previously, the reactions involved are essentially oxyalkylation reactions involving a nitrogen-containing compound (non-resinous) having at least one labile hydrogen atom.

If one employs a compound such as ammonia, which is a gas, the oxyalkylation procedure can be conducted in equipment of the kind which has been described for oxyethylation, except that the procedure is reversed in that the diglycidyl ether as such is dissolved in inert solvent with or without an added catalyst, such as 1% of sodium methylate, and is reacted by slowly passing in the reactive nitrogen-containing reactant, to wit ammonia. However, the most important phase of the instant invention is concerned with organic nitrogen derivatives which are invariably solids or liquids as distinguished from gases. Therefore, the reaction with the oxyalkylating agent, i. e., the diglycidyl ether or, in any event, the polyepoxide reactant as described, is conducted in an ordinary reaction vessel which need not have the usual modifications necessary when a gas, such as ethylene oxide, is used. Indeed, the reactions can be conducted readily in glass laboratory equipment such as the kind used for resin manufacture as described in a number of patents, as, for example, aforementioned U. S. Patent No. 2,499,365. All that is necessary is to put the reactants together and note whether the reaction goes without the presence of a catalyst. Generally speaking, if there is a basic nitrogen atom present reaction will take place. If the reaction does not take place, or takes place too slowly, then one need only repeat the experiment using a small amount of catalyst, for instance, about one, two or 3 per cent of sodium methylate, or finely divided caustic soda. Any of the usual oxyalkylation catalysts can be employed. For obvious reasons, a basic catalyst is most desirable.

If the reaction proceeds too rapidly and an insoluble rubbery mass is obtained, the best procedure is simply to repeat the preparation with greater care and stop just short of the incipient gelation point and then determine if the reaction has gone to completion, or substantially so. In some instances when a reactant yields rubbery masses rather readily and there is no other objection to so doing, one is well advised to react the nitrogenous reactant with one or more moles of ethylene oxide and then use the oxyethylated derivative instead of the initial nitrogen-containing compound. As is also known, gelation often can be prevented by introducing some other group, such as a cyclohexyl group, a phenyl group, or a long-chain aliphatic group at a point where possibly there are two reactive groups immediately adjacent, as in the case of the primary amine. Actually, the choice of reactants is so wide and so diverse that this probably presents no real or additional difficulty in the overwhelming majority of cases.

For purpose of convenience the following examples are included in tabular form in Table III, following. In those examples where the reactant was 3A as described in Table I, actually there may have been comparatively small amounts of higher polymers present which were ignored for purpose of convenience. In other words, the product actually may have had a small amount of the higher polymers described in Example B1 in Table II.

TABLE III

| Ex. No. | Reactants | Molar Ratio | Time of Reaction (hrs.) | Max. Temp., °C. | Color and Physical State | Solubility |
|---|---|---|---|---|---|---|
| C1* | Triethanolamine 149.2 g.+3A 170 g. | 2:1 | 6 | 140 | Brown Semi-solid | $H_2O$—insoluble. 5% Acetic Acid—soluble. Xylene—soluble. |
| C2 | Tri-isopropanolamine 94 g.+3A 85 g. | 2:1 | 8.5 | 180 | ____do____ | $H_2O$—insoluble. 5% Acetic Acid—soluble. Xylene—soluble. |
| C3 | Dihydroxyethylethylene diamine 73 g.+3A 85 g. | 2:1 | 10 | 100 | Brownish Semi-solid | $H_2O$—insoluble. 5% Acetic Acid—soluble. Xylene—soluble. |
| C4 | Aniline 93 g.+3A 170 g. | 2:1 | 5 | 90 | Amber-colored hard solid | $H_2O$—insoluble. 5% Acetic Acid—insoluble. Xylene—insoluble. Xylene+$CH_3OH$—soluble. |
| C5 | Phenylethanolamine 137 g.+3A 170 g. | 2:1 | 4.5 | 95 | Yellow-colored brittle hard solid | $H_2O$—insoluble. 5% Acetic Acid—insoluble. Xylene—insoluble. Xylene+$CH_3OH$—soluble. |
| C6 | Phenyldiethanolamine 90.5 g.+3A 85 g. | 2:1 | 5 | 132 | Amber colored viscous liquid | $H_2O$—insoluble. 5% Acetic Acid—insoluble. Xylene—soluble. |
| C7 | Ethylphenylethanolamine 62.5 g.+3A 64.6 g. | 2:1 | 14 | 150 | Dark amber colored liquid | $H_2O$—insoluble. 5% Acetic Acid—insoluble. Xylene—soluble. |

| Ex. No. | Reactants | Molar Ratio | Time of Reaction (hrs.) | Max. Temp., °C. | Color and Physical State | Solubility |
|---|---|---|---|---|---|---|
| C8 | Diphenylamine 84.6 g.+3A 85 g | 2:1 | 7 | 188 | Dark brown liquid | H₂O—insoluble. 5% Acetic Acid—insoluble. Xylene—soluble. |
| C9 | Morpholine 87 g.+3A 170 g | 2:1 | 7 | 138 | Dark amber solid mass | H₂O—insoluble. 5% Acetic Acid—soluble. Xylene—soluble. |
| C10 | 1,3-dimethylurea 88.1 g.+3A 170 g. | 2:1 | 8.5 | 205 | Dark amber-colored solid | H₂O—insoluble. 5% Acetic Acid—insoluble. Xylene—insoluble. CH₃OH—soluble. |
| C11 | 1,3-diethylurea 58.1 g.+3A 85 g | 2:1 | 5.5 | 180 | Dark amber-colored hard mass | H₂O—insoluble. 5% Acetic Acid—dispersible. Xylene—soluble (hot). |
| C12 | Dibutylurea 86 g.+3A 85 g | 2:1 | 5.5 | 170 | Amber-colored viscous liquid | H₂O—insoluble. 5% Acetic Acid—dispersible. Xylene—soluble. |
| C13 | a-methylbenzyl ethanolamine 82.5 g.+3A 85 g. | 2:1 | 7.5 | 156 | Brown hard mass | H₂O—insoluble. 5% Acetic Acid—dispersible. Xylene—soluble. |
| C14 | a-methylbenzyl diethanolamine 104.5 g.+3A 85 g. | 2:1 | 7.5 | 148 | Wine-red viscous liquid | H₂O—insoluble. 5% Acetic Acid—soluble. Xylene—soluble. |
| C15 | N-aminopropyl morpholine 72 g.+3A 85 g. | 2:1 | 7.5 | 126 | Yellow sticky semi-solid | H₂O—insoluble. 5% Acetic Acid—soluble. Xylene—soluble. |
| C16 | N-hydroxyethyl morpholine 65.5 g.+3A 85 g. | 2:1 | 7.5 | 145 | Dark brown sticky semi-solid | H₂O—insoluble. 5% Acetic Acid—soluble. Xylene—soluble. |
| C17 | Cyclohexylamine 99 g.+3A 170 g | 2:1 | 9.5 | 142 | Dark brown semi-solid | H₂O—insoluble. 5% Acetic Acid—dispersible. Xylene—soluble. |
| C18 | Di-2-ethylhexyl ethanolamine 142.5 g.+3A 85 g. | 2:1 | 24 | 200 | Brownish thick liquid | H₂O—insoluble. 5% Acetic Acid—dispersible. Xylene—soluble. |
| C19 | Triethanolamine+urea 1:4 60+100 g., 3A 68 g. | 2:1 | 4 | 150 | Yellow hard solid | H₂O—insoluble. 5% Acetic Acid—insoluble. Xylene—insoluble. CH₃OH—soluble. |
| C20 | Triethanolamine+Propylene oxide 1:3 161.5 g.+3A 85 g. | 2:1 | 2 | 150 | Dark brown sticky mass | H₂O—insoluble. 5% Acetic Acid—soluble. Xylene—insoluble. Xylene+CH₃OH—soluble. |
| C21 | Triethanolamine+ethylene oxide 1:3 140.5 g.+3A 85 g. | 2:1 | 2 | 150 | Brownish red thick liquid | H₂O—soluble. 5% Acetic Acid—soluble. Xylene—insoluble. Xylene+CH₃OH—soluble. |
| C22 | Triethanolamine+ethylene oxide 1:6, 206.5 g.+3A 85 g. | 2:1 | 6.5 | 156 | Dark brown thick liquid | H₂O—soluble. 5% Acetic Acid—soluble. Xylene—insoluble. Xylene+CH₃OH—soluble. |
| C23 | Triethanolamine+propylene oxide 1:6, 248.5 g.+3A 85 g. | 2:1 | 6.5 | 157 | ___do___ | H₂O—insoluble. 5% Acetic Acid—soluble. Xylene—partly soluble. Xylene+CH₃OH—soluble. |
| C24 | Triethanolamine+ethylene oxide 1:9, 272.5 g.+3A 85 g. | 2:1 | 6.5 | 165 | ___do___ | H₂O—soluble. 5% Acetic Acid—soluble. Xylene—insoluble. Xylene+CH₃OH—soluble. |
| C25 | Triethanolamine+propylene oxide 1:9, 268.4 g.+3A 68 g. | 2:1 | 13 | 165 | ___do___ | H₂O—insoluble. 5% Acetic Acid—soluble. Xylene—partly soluble. Xylene+CH₃OH—soluble. |
| C26 | 2-aminopyridine 94 g.+3A 170 g | 2:1 | 17 | 160 | Black hard solid | H₂O—insoluble. 5% Acetic Acid—soluble. Xylene—insoluble. CH₃OH—soluble. |
| C27 | N-methyl aniline 53.5 g.+3A 85 g | 2:1 | 4 | 162 | Amber-colored semi-solid | H₂O—insoluble. 5% Acetic Acid—insoluble. Xylene—soluble. |
| C28 | N-ethylaniline 60.6 g.+3A 85 g | 2:1 | 4 | 157 | Brown semi-solid | H₂O—insoluble. 5% Acetic Acid—insoluble. Xylene—soluble. |
| C29 | Ethyl diethanolamine 68.5 g.+3A 85 g. | 2:1 | 4 | 147 | Brown rubbery mass | H₂O—insoluble. 5% Acetic Acid—soluble (difficult). Xylene—soluble, partly. Xylene+CH₃OH—soluble. |
| C30 | Butyl diethanolamine 82.5 g.+3A 85 g. | 2:1 | 4 | 163 | Dark brown thick liquid | H₂O—insoluble. 5% Acetic Acid—soluble. Xylene—partly soluble. Xylene+CH₃OH—soluble. |
| C31 | Benzylamine 53.6 g.+3A 85 g | 2:1 | 3 | 176 | Yellow solid | H₂O—insoluble. 5% Acetic Acid—dispersible. Xylene—partly soluble. Xylene+CH₃OH—soluble. |
| C32 | 2-amino-4-methyl pentane 50.5 g.+3A 85 g. | 2:1 | 3 | 142 | Brownish solid | H₂O—insoluble. 5% Acetic Acid—dispersible. Xylene—soluble. |
| C33 | 2-amino-2-ethyl 1,3-propanediol 66.5 g.+3A 85 g. | 2:1 | 3 | 154 | Dark brown solid | H₂O—insoluble. 5% Acetic Acid—soluble. Xylene—insoluble. Xylene+CH₃OH—soluble. |
| C34 | 2-amino-2-methyl 1,3-propanediol 54.5 g.+3A 85 g. | 2:1 | 3 | 162 | Brown solid | H₂O—insoluble. 5% Acetic Acid—soluble. Xylene—insoluble. Xylene+CH₃OH—soluble (difficult). |
| C35 | Diamylamine 78.7 g.+3A 85 g | 2:1 | 6 | 170 | Brown viscous liquid | H₂O—insoluble. 5% Acetic Acid—insoluble. Xylene—soluble. |
| C36 | Nonylamine 71.7 g.+3A 85 g | 2:1 | 6 | 170 | Yellow semi-solid | H₂O—insoluble. 5% Acetic Acid—insoluble. Xylene—soluble. |
| C37 | Di-2-ethyl hexylamine 120.5 g.+3A 85 g. | 2:1 | 6 | 175 | Yellow viscous liquid | H₂O—insoluble. 5% Acetic Acid—insoluble. Xylene—soluble. |

| Ex. No. | Reactants | Molar Ratio | Time of Reaction (hrs.) | Max. Temp., °C. | Color and Physical State | Solubility |
|---|---|---|---|---|---|---|
| C38 | Furfurylamine 97 g.+3A 170 g. | 2:1 | 6 | 170 | Dark brown semi-solid | H₂O—insoluble. 5% Acetic Acid—dispersible. Xylene—soluble. |
| C39 | Ethylenediamine 60 g.+3A 170 g. | 2:1 | 2.5 | 110 | Yellow semi-solid | H₂O—insoluble. 5% Acetic Acid—soluble. Xylene—insoluble. Xylene+CH₃OH—soluble. |
| C40 | Propylene diamine 74 g.+3A 170 g. | 2:1 | 2.5 | 112 | ....do.... | H₂O—insoluble. 5% Acetic Acid—soluble. Xylene—insoluble. Xylene+CH₃OH—soluble. |
| C41 | P-phenylene diamine 54 g.+3A 85 g. | 2:1 | 6 | 162 | Black brittle solid | H₂O—insoluble. 5% Acetic Acid—soluble. Xylene—insoluble. Xylene+CH₃OH—soluble. |
| C42 | Diethylene triamine 103.2 g.+3A 170 g. | 2:1 | 6 | 150 | Brownish semi-solid | H₂O—dispersible. 5% Acetic Acid—soluble. Xylene—dispersible. Xylene+CH₃OH—soluble. |
| C43 | Tetraethylene pentamine 94.7 g.+3A 85 g. | 2:1 | 4 | 150 | Amber-colored semi-solid | H₂O—dispersible. 5% Acetic Acid—soluble. Xylene—dispersible. Xylene+CH₃OH—soluble. |
| C44 | Tetraethanol tetraethylene pentamine 182.7 g.+3A 85 g. | 2:1 | 4 | 145 | Dark amber colored semi-solid | H₂O—dispersible. 5% Acetic Acid—soluble. Xylene—dispersible. Xylene+CH₃OH—soluble. |
| C45 | As to nitrogen compound, see Note 1 below: 141.6 g.+3A 51 g. | 2:1 | 5.5 | 180 | Dark brown brittle solid | H₂O—insoluble. 5% Acetic Acid—soluble. Xylene—soluble. |
| C46 | As to nitrogen compound, see Note 2 below: 206 g.+3A 34 g. | 2:1 | 5.5 | 83 | Dark amber colored thick fluid | H₂O—insoluble. 5% Acetic Acid—soluble. Xylene—soluble. |
| C47 | Triethanolamine+Propylene oxide 1:12, 169 g.+3A 34 g. | 2:1 | 7 | 165 | Dark brown thick liquid | H₂O—insoluble. 5% Acetic Acid—soluble. Xylene—Soluble. |
| C48 | Triethanolamine+ethylene oxide 1:12, 135.4 g.+3A 34 g. | 2:1 | 7 | 170 | ....do.... | H₂O—soluble. 5% Acetic Acid—soluble. Xylene—soluble (partly). Xylene+CH₃OH—soluble. |
| C49 | Triethanolamine+propylene oxide 1:18, 238.6 g.+3A 34 g. | 2:1 | 1.75 | 110 | Yellow thick liquid | H₂O—insoluble. 5% Acetic Acid—soluble. Xylene—soluble. |
| C50 | Triethanolamine+ethylene oxide 1:18, 188.2 g.+3A 34 g. | 2:1 | 2.5 | 160 | Dark brown thick liquid | H₂O—soluble. 5% Acetic Acid—soluble. Xylene—soluble (cloudy). Xylene+CH₃OH—soluble. |
| C51 | Triethanolamine+Propylene oxide 1:15, 203.8 g.+3A 34 g. | 2:1 | 2.5 | 157 | ....do.... | H₂O—dispersible. 5% Acetic Acid—soluble. Xylene—soluble. |
| C52 | Triethanolamine+ethylene oxide 1:15, 161.8 g.+3A 34 g. | 2:1 | 2.5 | 160 | ....do.... | H₂O—soluble. 5% Acetic Acid—soluble. Xylene—soluble (cloudy). Xylene+CH₃OH—soluble. |
| C53 | Decylamine 10D 78.5 g.+3A 85 g. | 2:1 | 8.5 | 172 | Light brown solid | H₂O—insoluble. 5% Acetic Acid—insoluble. Xylene—soluble. |
| C54 | Dodecylamine 12D 92.5 g.+3A 85 g. | 2:1 | 8.5 | 188 | ....do.... | H₂O—insoluble. 5% Acetic Acid—insoluble. Xylene—soluble. |
| C55 | Hexadecylamine 16D 122 g.+3A 85 g. | 2:1 | 8.5 | 175 | ....do.... | H₂O—insoluble. 5% Acetic Acid—insoluble. Xylene—soluble. |
| C56 | Octadecylamine 18D 133.5 g.+3A 85 g. | 2:1 | 8.5 | 174 | ....do.... | H₂O—insoluble. 5% Acetic Acid—insoluble. Xylene—soluble. |
| C57 | P-aminophenol 54.5 g.+3A 85 g. | 2:1 | 8.0 | 175 | Black brittle solid | H₂O—soluble. 5% Acetic Acid—soluble. Xylene—insoluble. |
| C58 | Beta-phenylethyl amine 60.5 g.+3A 85 g. | 2:1 | 8.0 | 155 | Amber semi-solid | H₂O—insoluble. 5% Acetic Acid—insoluble. Xylene—soluble. Xylene+CH₃OH—soluble. |
| C59 | Benzenesulfonyl ethyl amide 92.6 g.+3A 85 g. | 2:1 | 8.0 | 178 | Amber thick liquid | H₂O—insoluble. 5% Acetic Acid—insoluble. Xylene—soluble. |
| C60 | Benzene sulfonyl isopropylamide 99.6 g.+3A 85 g. | 2:1 | 8.0 | 170 | ....do.... | H₂O—insoluble. 5% Acetic Acid—insoluble. Xylene—soluble. |
| C61 | Benzene sulfonamide 78.6 g.+3A 85 g. | 2:1 | 2.5 | 205 | Dark brown solid | H₂O—insoluble. 5% Acetic Acid—insoluble. Xylene—insoluble. |
| C62 | P-toluene sulfonyl ethylamide 99.7 g.+3A 85 g. | 2:1 | 2.5 | 190 | Amber thick liquid | H₂O—insoluble. 5% Acetic Acid—insoluble. Xylene—soluble. Xylene+CH₃OH—soluble. |
| C63 | Armid 10** 86 g.+3A 85 g. | 2:1 | 8.0 | 170 | Brown solid | H₂O—insoluble. 5% Acetic Acid—insoluble. Xylene—insoluble. Xylene+CH₃OH—soluble. |
| C64 | Armid 14** 57 g.+3A 43 g. | 2:1 | 8.0 | 175 | ....do.... | H₂O—insoluble. 5% Acetic Acid—insoluble. Xylene—insoluble. Xylene+CH₃OH—soluble. |
| C65 | Armid 16** 65.5 g.+3A 43 g. | 2:1 | 8.0 | 190 | Yellow solid | H₂O—insoluble. 5% Acetic Acid—insoluble. Xylene—insoluble. Xylene+CH₃OH—soluble. |
| C66 | Triethanolamine+propylene oxide 133.8 g.+3A 17 g. | 2:1 | 5.0 | 175 | Dark brown liquid | H₂O—insoluble. 5% Acetic Acid—soluble. Xylene—soluble. |
| C67 | Triethanolamine+propylene oxide 1:27, 171.5 g.+3A 17 g. | 2:1 | 4.5 | 180 | ....do.... | H₂O—insoluble. 5% Acetic Acid—soluble. Xylene—soluble. |

| Ex. No. | Reactants | Molar Ratio | Time of Reaction (hrs.) | Max. Temp., °C. | Color and Physical State | Solubility |
|---|---|---|---|---|---|---|
| C68 | Triethanolamine+propylene oxide 1:30.2, 190 g.+3A 17 g. | 2:1 | 4.5 | 185 | Dark brown liquid | H₂O—insoluble. 5% Acetic Acid—soluble. Xylene—soluble. |
| C69 | Triethanolamine+ethylene oxide 1:21.2, 108.2 g.+3A 17 g. | 2:1 | 4.5 | 190 | ___do___ | H₂O—soluble. 5% Acetic Acid—soluble. Xylene+alcohol—soluble. |
| C70 | Triethanolamine+ethylene oxide 1:24.3, 121.8 g.+3A 17 g. | 2:1 | 4.5 | 180 | ___do___ | H₂O—soluble. 5% Acetic Acid—soluble. Xylene+alcohol. (1:1 mix)—soluble. |
| C71 | Triethanolamine+ethylene oxide 1:26.9, 133.3 g.+3A 17 g. | 2:1 | 4.5 | 185 | ___do___ | H₂O—soluble. 5% Acetic Acid—soluble. Xylene+alcohol. (1:1 mix)—soluble. |
| C72 | Triethanolamine+ethylene oxide 1:33.8, 163.6 g.+3A 17 g. | 2:1 | 4.5 | 180 | ___do___ | H₂O—soluble. 5% Acetic Acid—soluble. Xylene+alcohol. (1:1 mix)—soluble. |
| C73 | Furfurylamine+propylene oxide 1:17.9, 113.5 g.+3A 17 g. | 2:1 | 2.0 | 175 | ___do___ | H₂O—insoluble. 5% Acetic Acid—soluble. Xylene—soluble. |
| C74 | Furfurylamine+propylene oxide 1:21, 131.5 g.+3A 17 g. | 2:1 | 2.0 | 160 | ___do___ | H₂O—insoluble. 5% Acetic Acid—soluble. Xylene—soluble. |
| C75 | Furfurylamine+propylene oxide 1:24, 148.9 g.+3A 17 g. | 2:1 | 2.0 | 180 | ___do___ | H₂O—insoluble. 5% Acetic Acid—soluble. Xylene—soluble. |
| C76 | Furfurylamine+propylene oxide 1:26.5, 163.4 g.+3A 17 g. | 2:1 | 2.0 | 195 | ___do___ | H₂O—insoluble. 5% Acetic Acid—soluble. Xylene—soluble. |
| C77 | Furfurylamine+propylene oxide 1:30.5, 186.6 g.+3A 17 g. | 2:1 | 1.0 | 175 | ___do___ | H₂O—insoluble. 5% Acetic Acid—soluble. Xylene—soluble. |
| C78 | Furfurylamine+propylene oxide 1:51.8, 155 g.+3A 9 g. | 2:1 | 1.0 | 185 | ___do___ | H₂O—insoluble. 5% Acetic Acid—soluble. Xylene—soluble. |
| C79 | Tetraethylene pentamine+propylene oxide 1:24.3, 160 g.+3A 17 g. | 2:1 | 2 | 190 | Dark brown thick liquid | H₂O—dispersible. 5% Acetic Acid—soluble. Xylene—soluble. |
| C80 | Diethylene triamine+propylene oxide 1:9.8, 134.4 g.+3A 34 g. | 2:1 | 0.5 | 120 | Brown thick liquid | H₂O—dispersible. 5% Acetic Acid—soluble. Xylene—soluble. |
| C81 | Diethylene triamine+propylene oxide 1:18.7, 118.8 g.+3A 17 g. | 2:1 | 0.5 | 147 | ___do___ | H₂O—dispersible. 5% Acetic Acid—soluble. Xylene—soluble. |
| C82 | Triethylene tetramine+propylene oxide 1:12, 85.2 g.+3A 17 g. | 2:1 | 0.5 | 95 | ___do___ | H₂O—dispersible. 5% Acetic Acid—soluble. Xylene—soluble. |
| C83 | Triethylene tetramine+propylene oxide 1:19.6, 128.4 g.+3A 17 g. | 2:1 | 0.5 | 95 | ___do___ | H₂O—dispersible. 5% Acetic Acid—soluble. Xylene—soluble. |
| C84 | Propylene diamine+propylene oxide 1:8.5, 564 g.+3A 17 g. | 2:1 | 1 | 108 | ___do___ | H₂O—insoluble. 5% Acetic Acid—soluble. Xylene—soluble. |
| C85 | Propylene diamine+propylene oxide 1:10.3, 67 g.+3A 17 g. | 2:1 | 1 | 100 | Yellow thick liquid | H₂O—insoluble. 5% Acetic Acid—soluble. Xylene—soluble. |
| C86 | Propylene diamine+propylene oxide 1:20, 121 g.+3A 17 g. | 2:1 | 1 | 100 | ___do___ | H₂O—insoluble. 5% Acetic Acid—soluble. Xylene—soluble. |
| C87 | Propylene diamine+propylene oxide 1:25, 183 g.+3A 17 g. | 2:1 | 1 | 100 | ___do___ | H₂O—insoluble. 5% Acetic Acid—soluble. Xylene—soluble. |
| C88 | Meta-phenylene diamine+propylene oxide 1:11.7, 78.6 g.+3A 17 g. | 2:1 | 1.5 | 90 | Dark amber thick liquid | H₂O—insoluble. 5% Acetic Acid—dispersible. Xylene—soluble. |
| C89 | Meta-phenylene diamine+propylene oxide 1:27.6, 88.4 g.+3A 9 g. | 2:1 | 2 | 100 | ___do___ | H₂O—insoluble. 5% Acetic Acid—dispersible. Xylene—soluble. |
| C90 | Meta-phenylene diamine+propylene oxide 1:43, 130 g.+3A 9 g. | 2:1 | 2 | 105 | ___do___ | H₂O—insoluble. 5% Acetic Acid—dispersible. Xylene—soluble. |
| C91 | Meta-phenylene diamine+propylene oxide 1:55, 165 g.+3A 9 g. | 2:1 | 2 | 95 | ___do___ | H₂O—insoluble. 5% Acetic Acid—dispersible. Xylene—soluble. |
| C92 | Furfurylamine+ethylene oxide+ propylene oxide 1:15.5:11.3, 143.4 g.+3A 17 g. | 2:1 | .75 | 100 | Brown thick liquid | H₂O—dispersible. 5% Acetic Acid—soluble. Xylene—soluble. |
| C93 | Furfurylamine+ethylene oxide+ propylene oxide 1:15.5:16.4, 173 g.+3A 17 g. | 2:1 | .75 | 100 | ___do___ | H₂O—dispersible. 5% Acetic Acid—soluble. Xylene—soluble. |
| C94 | Furfurylamine+ethylene oxide+ propylene oxide 1:15.5:23.5, 214.2 g.+3A 17 g. | 2:1 | 2 | 140 | ___do___ | H₂O—dispersible. 5% Acetic Acid—soluble. Xylene—soluble. |
| C95 | Furfurylamine+ethylene oxide+ propylene oxide 1:15.5:32.2, 264.7 g.+3A 17 g. | 2:1 | 2 | 130 | ___do___ | H₂O—dispersible. 5% Acetic Acid—soluble. Xylene—soluble. |
| C96 | Cationic Amine 220, 150 g.+3A 85 g. (See Note 3). | 2:1 | 3 | 200 | Dark brown semi-solid | H₂O—insoluble. 5% Acetic Acid—soluble. Xylene—soluble. |

*2% sodium methylate used as catalyst.
NOTE 1.—Obtained by reaction from 2 moles butylphenol, 2 moles formaldehyde, and 1 mole dihydroxyethyl, ethylenediamine.
NOTE 2.—Obtained by reaction from 1 mole amylphenol resin, 2 moles formaldehyde, and 2 moles diethanolamine.
**See previous reference to this material.
NOTE 3.—Amine 220 is 1-hydroxyethyl-2-heptadecenyl glyoxalidine, a product of Carbide & Carbon Chemicals Corporation.
Products obtained by oxyalkylation of amines, involving either oxyethylation or oxypropylation, or both, are expressed in molal ratios of amine to alkylene oxide in this table and subsequent Table of E examples.

As previously pointed out one can use the product which is a mixture of the monomer derived from bisphenol A and corresponding to the previous formula of:

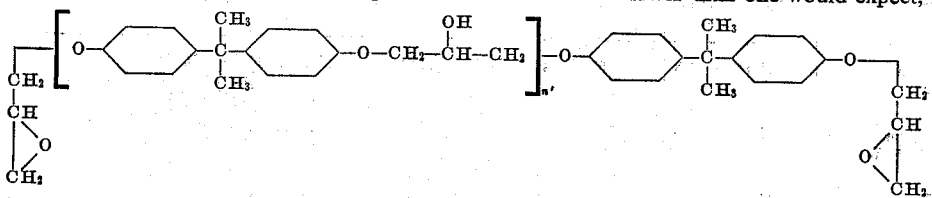

in which n varies from 1 to 3 and, as far as is possible to determine from molecular weight and hydroxyl value, etc., it corresponds approximately to the following composition:

75%—where $n'$ is 0
12%—where $n'$ is 1
8%—where $n'$ is 2
5%—where $n'$ is 3

The average molecular weight is 460 compared to 340 for the monomer (where $n'$ is 0). However, the fact that the epoxide value, whether using pyridine hydrochloride dissolved in pyridine or in chloroform, is still definitely lower than one would expect, indicates beyond doubt the presence of some monoepoxide. In any event, a whole series of compounds has been made using this particular cogeneric mixture and assuming the molecular weight to be 462. The color and physical appearance of the products were substantially the same as in the case of Table III. The xylene solubility was at least as good as the corresponding compounds in Table III and the solubility in acetic acid was usually no better than, and perhaps not quite as good as the corresponding products in Table III. The data is again summarized for convenience in Table IV, following.

TABLE IV

| Ex. No. | Reactants | Molar Ratio | Time of Reaction (hrs.) | Max. Temp., °C. | Color and Physical State | Solubility |
|---|---|---|---|---|---|---|
| E1* | Triethanolamine 149.2 g.+B1 231 g. | 2:1 | 6 | 142 | Brownish semi-solid | H₂O—insoluble. 5% Acetic Acid—soluble. Xylene—soluble. |
| E2 | Tri-isopropanolamine 94 g.+B1 116 g. | 2:1 | 8.5 | 183 | do | H₂O—insoluble. 5% Acetic Acid—soluble. Xylene—soluble. |
| E3 | Dihydroxyethylethylene diamine 73 g.+B1 116 g. | 2:1 | 10 | 102 | Brown semi-solid | H₂O—insoluble. 5% Acetic Acid—soluble. Xylene—insoluble. |
| E4 | Aniline 93 g.+B1 231 g. | 2:1 | 5 | 94 | Dark amber almost hard solid | H₂O—insoluble. 5% Acetic Acid—insoluble. Xylene—insoluble. Xylene+CH₃OH—soluble. |
| E5 | Phenylethanolamine 137 g.+B1 231 g. | 2:1 | 4.5 | 93 | Yellow brittle solid | H₂O—insoluble. 5% Acetic Acid—insoluble. Xylene—insoluble. Xylene+CH₃OH—soluble. |
| E6 | Phenyldiethanolamine 90.5 g+B1 116 g. | 2:1 | 5 | 179 | Dark amber viscous liquid | H₂O—insoluble. 5% Acetic Acid—insoluble. Xylene—soluble. |
| E7 | Ethylphenylethanolamine 62.5 g. +B1 88 g. | 2:1 | 14 | 152 | Amber liquid | H₂O—insoluble. 5% Acetic Acid—insoluble. Xylene—soluble. |
| E8 | Diphenylamine 84.6 g.+B1 116 | 2:1 | 7 | 191 | Brown liquid | H₂O—insoluble. 5% Acetic Acid—insoluble. Xylene—soluble. |
| E9 | Morpholine 87 g.+B1 231 g. | 2:1 | 7 | 140 | Amber solid mass | H₂O—insoluble. 5% Acetic Acid—soluble. Xylene—soluble. |
| E10 | 1,3-dimethyl urea 88.1 g.+B1 231 g. | 2:1 | 8.5 | 202 | Amber solid | H₂O—insoluble. 5% Acetic Acid—insoluble. Xylene—insoluble. CH₃OH—soluble. |
| E11 | 1,3-diethyl urea 58.1 g.+B1 116 g. | 2:1 | 5.5 | 181 | Amber almost hard mass | H₂O—insoluble. 5% Acetic Acid—dispersible. Xylene—soluble (hot). |
| E12 | Dibutylurea 86 g.+B1 116 g. | 2:1 | 5.5 | 172 | Dark amber thick liquid | H₂O—insoluble. 5% Acetic Acid—dispersible. Xylene—soluble. |
| E13 | Alpha-methylbenzyl ethanolamine 82.5 g.+B1 116 g. | 2:1 | 7.5 | 155 | Brownish almost hard mass | H₂O—insoluble. 5% Acetic Acid—dispersible. Xylene—soluble. |
| E14 | Alpha-methylbenzyl diethanolamine 104.5 g.+B1 116 g. | 2:1 | 7.5 | 150 | Red thick liquid | H₂O—insoluble. 5% Acetic Acid—soluble. Xylene—soluble. |
| E15 | N-aminopropyl morpholine 72 g.+ B1 116 g. | 2:1 | 7.5 | 129 | Amber viscous liquid | H₂O—insoluble. 5% Acetic Acid—soluble. Xylene—soluble. |
| E16 | N-hydroxyethyl morpholine 65.5 g.+B1 116 g. | 2:1 | 7.5 | 144 | Amber viscous mass | H₂O—insoluble. 5% Acetic Acid—soluble. Xylene—soluble. |
| E17 | Cyclohexylamine 99 g.+B1 231 g. | 2:1 | 9.5 | 143 | Brown almost hard solid | H₂O—insoluble. 5% Acetic Acid—dispersible. Xylene—soluble. |
| E18 | Di-2-ethylhexyl ethanolamine 142.5 g.+B1 116 g. | 2:1 | 2.4 | 202 | Brown viscous liquid | H₂O—insoluble. 5% Acetic Acid—dispersible. Xylene—soluble. |
| E19 | Triethanolamine+urea 1:4 60+ 100 g.+B1 92.5 g. | 2:1 | 4 | 148 | Amber solid | H₂O—insoluble. 5% Acetic Acid—insoluble. Xylene—insoluble. CH₃OH—soluble. |
| E20 | Triethanolamine+propylene oxide 1:3, 161.5 g.+B1 116 g. | 2:1 | 2 | 151 | Brown viscous mass | H₂O—insoluble. 5% Acetic Acid—soluble. Xylene—insoluble. Xylene+CH₃OH—soluble. |
| E21 | Triethanolamine+ethylene oxide 1:3, 140.5 g.+B1 116 g. | 2:1 | 2 | 149 | Reddish brown viscous liquid | H₂O—soluble. 5% Acetic Acid—soluble. Xylene—insoluble. Xylene+CH₃OH—soluble. |

| Ex. No. | Reactants | Molar Ratio | Time of Reaction (hrs.) | Max. Temp., °C | Color and Physical State | Solubility |
|---|---|---|---|---|---|---|
| E22 | Triethanolamine+ethylene oxide 1:6, 206.5 g.+B1 116 g. | 2:1 | 6.5 | 158 | Viscous brown liquid | $H_2O$—soluble. 5% Acetic Acid—soluble. Xylene—insoluble. Xylene+$CH_3OH$—soluble. |
| E23 | Triethanolamine+propylene oxide 1:6, 248.5 g.+ B1 116 g. | 2:1 | 6.5 | 155 | ......do...... | $H_2O$—insoluble. 5% Acetic Acid—soluble. Xylene—Partly soluble. Xylene+$CH_3OH$—soluble. |
| E24 | Triethanolamine+ethylene oxide 1:9, 272.5 g.+B1 116 g. | 2:1 | 6.5 | 167 | Brown viscous mass | $H_2O$—soluble. 5% Acetic Acid—soluble. Xylene—insoluble. Xylene+$CH_3OH$—soluble. |
| E25 | Triethanolamine+propylene oxide 1:9, 268.4 g.+B1 92.5 g. | 2:1 | 13 | 162 | Thick brown liquid | $H_2O$—insoluble. 5% Acetic Acid—soluble. Xylene—Partly soluble. Xylene+$CH_3OH$—soluble. |
| E26 | 2-Aminopyridine 94 g.+B1 231 g. | 2:1 | 17 | 158 | Black hard mass | $H_2O$—insoluble. 5% Acetic Acid—soluble. Xylene—insoluble. $CH_3OH$—soluble. |
| E27 | N-methyl aniline 53.5 g.+B1 116 g. | 2:1 | 4 | 165 | Yellowish viscous liquid | $H_2O$—insoluble. 5% Acetic Acid—insoluble. Xylene—soluble. |
| E28 | N-ethyl aniline 60.6 g.+B1 116 g. | 2:1 | 4 | 160 | Brownish semi-solid | $H_2O$—insoluble. 5% Acetic Acid—insoluble. Xylene—soluble. |
| E29 | Ethyldiethanolamine 68.5 g.+B1 116 g. | 2:1 | 4 | 146 | Brown viscous mass | $H_2O$—insoluble. 5% Acetic Acid—soluble (difficult). Xylene—Partly soluble. Xylene+$CH_3OH$—soluble. |
| E30 | Butyldiethanolamine 82.5 g.+B1 116 g. | 2:1 | 4 | 160 | Thick brown liquid | $H_2O$—insoluble. 5% Acetic Acid—soluble. Xylene—Partly soluble. Xylene+$CH_3OH$—soluble. |
| E31 | Benzylamine 53.6 g.+B1 116 g. | 2:1 | 3 | 178 | Amber solid | $H_2O$—insoluble. 5% Acetic Acid—dispersible. Xylene—Partly soluble. Xylene+$CH_3OH$—soluble. |
| E32 | 2-amino-4-methyl pentane 50.5 g. +B1 116 g. | 2:1 | 3 | 143 | ......do...... | $H_2O$—insoluble. 5% Acetic Acid—dispersible. Xylene—soluble. |
| E33 | 2-amino-2-ethyl 1, 3-propanediol 66.5 g.+B1 116 g. | 2:1 | 3 | 152 | Dark amber solid | $H_2O$—insoluble. 5% Acetic Acid—soluble. Xylene—insoluble. Xylene+$CH_3OH$—soluble. |
| E34 | 2-amino-2-methyl 1, 3-propanediol 54.5 g.+B1 116 g. | 2:1 | 3 | 160 | Amber solid | $H_2O$—insoluble. 5% Acetic Acid—soluble. Xylene—insoluble. Xylene+$CH_3OH$—soluble. |
| E35 | Diamylamine 78.7 g. + B1 116 g. | 2:1 | 6 | 173 | Amber thick liquid | $H_2O$—Insoluble. 5% Acetic Acid—insoluble. Xylene—soluble. |
| E36 | Nonylamine 71.7 g.+B1 116 g. | 2:1 | 6 | 169 | Amber viscous mass | $H_2O$—insoluble. 5% Acetic Acid—insoluble. Xylene—soluble. |
| E37 | Di-2-ethylhexylamine 120.5 g.+B1 116 g. | 2:1 | 6 | 171 | Amber thick liquid | $H_2O$—insoluble. 5% Acetic Acid—insoluble. Xylene—soluble. |
| E38 | Furfurylamine 97 g.+B1 231 g. | 2:1 | 6 | 168 | Dark amber mass | $H_2O$—insoluble. 5% Acetic Acid—dispersible. Xylene—soluble. |
| E39 | Ethylene diamine 60 g.+B1 231 g. | 2:1 | 2.5 | 112 | Amber viscous mass | $H_2O$—insoluble. 5% Acetic Acid—soluble. Xylene—insoluble. Xylene+$CH_3OH$—soluble. |
| E40 | Propylene diamine 74 g.+B1 231 g. | 2:1 | 2.5 | 114 | ......do...... | $H_2O$—insoluble. 5% Acetic Acid—soluble. Xylene—insoluble. Xylene+$CH_3OH$—soluble. |
| E41 | p-phenylene diamine 54 g.+B1 116 g. | 2:1 | 6 | 160 | Dark brittle solid | $H_2O$—insoluble. 5% Acetic Acid—soluble. Xylene—insoluble. Xylene+$CH_3OH$—soluble. |
| E42 | Diethylene triamine 103.2 g.+B1 231 g. | 2:1 | 6 | 173 | Dark amber mass | $H_2O$—dispersible. 5% Acetic Acid—soluble. Xylene—dispersible. Xylene+$CH_3OH$—soluble. |
| E43 | Tetraethylene pentamine 94.7 g.+ B1 116 g. | 2:1 | 4 | 151 | Amber hard mass | $H_2O$—dispersible. 5% Acetic Acid—soluble. Xylene—dispersible. Xylene+$CH_3OH$—soluble. |
| E44 | Tetraethanol tetraethylene pentamine 182.7 g.+B1 116 g. | 2:1 | 4 | 148 | Darkish brown almost hard mass | $H_2O$—dispersible. 5% Acetic Acid—soluble. Xylene—dispersible Xylene+$CH_3OH$—soluble. |
| E45 | As to nitrogen compound See Note 1, 141.6 g.+B1 69 g. | 2:1 | 5.5 | 176 | Dark amber hard mass | $H_2O$—insoluble. 5% Acetic Acid—soluble. Xylene—soluble. |
| E46 | As to nitrogen compound See Note 2, 206 g.+B1 46 g. | 2:1 | 5.5 | 85 | Viscous yellow liquid | $H_2O$—insoluble. 5% Acetic Acid—soluble. Xylene—soluble. |
| E47 | Triethanolamine+propylene oxide 1:12, 169 g.+B1 46 g. | 2:1 | 7 | 166 | Viscous brown liquid | $H_2O$—insoluble. 5% Acetic Acid—soluble. Xylene—soluble. |
| E48 | Triethanolamine+ethylene oxide 1:12, 135.4 g.+B1 46 g. | 2:1 | 7 | 172 | ......do...... | $H_2O$—soluble. 5+ Acetic Acid—soluble. Xylene—partly soluble. Xylene+$CH_3OH$—soluble. |
| E49 | Triethanolamine+propylene oxide 1:18, 238.6 g.+B1 46 g. | 2:1 | 1.75 | 112 | Viscous amber liquid | $H_2O$—insoluble. 5% Acetic Acid—soluble. Xylene—soluble. |

| Ex. No. | Reactants | Molar Ratio | Time of Reaction (hrs.) | Max. Temp., °C. | Color and Physical State | Solubility |
|---|---|---|---|---|---|---|
| E50 | Triethanolamine+ethylene oxide 1:18, 188.2 g.+B1 46 g. | 2:1 | 2.5 | 158 | Dark amber viscous liquid | H₂O—soluble. 5% Acetic Acid—soluble. Xylene—soluble but cloudy. Xylene+CH₃OH—soluble. |
| E51 | Triethanolamine+propylene oxide 1:15, 203.8 g.+B1 46 g. | 2:1 | 2.5 | 160 | Dark amber thick liquid | H₂O—dispersible. 5% Acetic Acid—soluble. Xylene—soluble. |
| E52 | Triethanolamine+ethylene oxide 1:15, 161.8 g.+B1 46 g. | 2:1 | 2.5 | 158 | do | H₂O—soluble. 5% Acetic Acid—soluble. Xylene—soluble (cloudy). Xylene+CH₃OH—soluble. |
| E53 | Decylamine 10D 78.5 g.+B1 115 g. | 2:1 | 8.5 | 170 | Amber mass | H₂O—insoluble. 5% Acetic Acid—insoluble. Xylene—soluble. |
| E54 | Dodecylamine 12D 92.5 g.+B1 115 g. | 2:1 | 8.5 | 186 | do | H₂O—insoluble. 5% Acetic Acid—insoluble. Xylene—soluble. |
| E55 | Hexadecylamine 16D 122 g.+B1 115 g. | 2:1 | 8.5 | 172 | do | H₂O—insoluble. 5% Acetic Acid—insoluble. Xylene—soluble. |
| E56 | Octadecylamine 18D 133.5 g.+B1 115 g. | 2:1 | 8.5 | 176 | do | H₂O—insoluble. 5% Acetic Acid—insoluble. Xylene—soluble. |
| E57 | p-aminophenol 54.5 g.+B1 115 g. | 2:1 | 8.0 | 173 | Almost black solid | H₂O—soluble. 5% Acetic Acid—soluble. Xylene—insoluble. Xylene+CH₃OH—soluble. |
| E58 | Beta-phenyl ethylamine 60.5 g.+B1 115 g. | 2:1 | 8 | 150 | Brownish viscous mass | H₂O—insoluble. 5% Acetic Acid—insoluble. Xylene—soluble. |
| E59 | Benzene sulfonyl ethylamide 92.6 g.+B1 115 g. | 2:1 | 8 | 175 | do | H₂O—insoluble. 5% Acetic Acid—insoluble. Xylene—soluble. |
| E60 | Benzene sulfonyl isopropylamide 99.6 g.+B1 115 g. | 2:1 | 8 | 173 | do | H₂O—insoluble. 5% Acetic Acid—insoluble. Xylene—soluble. |
| E61 | Benzene sulfonamide 78.6 g.+B1 115 g. | 2:1 | 2.5 | 202 | Dark brown solid mass | H₂O—insoluble. 5% Acetic Acid—insoluble. Xylene—insoluble. Xylene+CH₃OH—soluble. |
| E62 | p-toluene sulfonylethyl amide 99.7 g.+B1 115 g. | 2:1 | 2.5 | 188 | Yellow viscous liquid | H₂O—insoluble. 5% Acetic Acid—insoluble. Xylene—soluble. |
| E63 | Armid 10** 86 g.+B1 115 g. | 2:1 | 8.0 | 168 | Dark amber mass | H₂O—insoluble. 5% Acetic Acid—insoluble. Xylene—insoluble. Xylene+CH₃OH—soluble. |
| E64 | Armid 14** 57 g.+B1 58 g. | 2:1 | 8.0 | 172 | do | H₂O—insoluble. 5% Acetic Acid—insoluble. Xylene—insoluble. Xylene+CH₃OH—soluble. |
| E65 | Armid 16** 64.5 g.+B1 58 g. | 2:1 | 8.0 | 189 | Amber solid | H₂O—insoluble. 5% Acetic Acid—insoluble. Xylene—insoluble. Xylene+CH₃OH—soluble. |
| E66 | Triethanolamine+propylene oxide 1:20.5, 133.8 g.+B1 23 g. | 2:1 | 5.0 | 172 | Reddish brown liquid | H₂O—insoluble. 5% Acetic Acid—soluble. Xylene—soluble. |
| E67 | Triethanolamine+propylene oxide 1:27, 171.5 g.+B1 23 g. | 2:1 | 4.5 | 181 | do | H₂O—insoluble. 5% Acetic Acid—soluble. Xylene—soluble. |
| E68 | Triethanolamine+propylene oxide 1:30.2, 190 g.+B1 23 g. | 2:1 | 4.5 | 178 | do | H₂O—insoluble. 5% Acetic Acid—soluble. Xylene—soluble. |
| E69 | Triethanolamine+ethylene oxide 1:21.2, 108.2 g.+B1 23 g. | 2:1 | 4.5 | 188 | do | H₂O—soluble. 5% Acetic Acid—soluble. Xylene+alcohol (1:1 mix)—soluble. |
| E70 | Triethanolamine+ethylene oxide 1:24.3, 121.8 g.+B1 23 g. | 2:1 | 4.5 | 178 | do | H₂O—soluble. 5% Acetic Acid—soluble. Xylene+alcohol (1:1 mix)—soluble. |
| E71 | Triethanolamine+ethylene oxide 1:26.9, 133.3 g.+B1 23 g. | 2:1 | 4.5 | 182 | do | H₂O—soluble. 5% Acetic Acid—soluble. Xylene+alcohol (1:1 mix)—soluble. |
| E72 | Triethanolamine+ethylene oxide 1:33.8, 163.6 g.+B1 23 g. | 2:1 | 4.5 | 183 | do | H₂O—soluble. 5% Acetic Acid—soluble. Xylene+alcohol (1:1 mix)—soluble. |
| E73 | Furfurylamine+propylene oxide 1:17.9, 113.5 g.+B1 23 g. | 2:1 | 2.0 | 173 | do | H₂O—insoluble. 5% Acetic Acid—dispersible. Xylene—soluble. |
| E74 | Furfurylamine+propylene oxide 1:21, 131.5 g.+B1 23 g. | 2:1 | 2.0 | 162 | do | H₂O—insoluble. 5% Acetic Acid—dispersible. Xylene—soluble. |
| E75 | Furfurylamine+propylene oxide 1:24, 148.9 g.+B1 23 g. | 2:1 | 2.0 | 178 | do | H₂O—insoluble. 5% Acetic Acid—dispersible. Xylene—soluble. |
| E76 | Furfurylamine+propylene oxide 1:26.5, 163.4 g.+B1 23 g. | 2:1 | 2.0 | 190 | do | H₂O—insoluble. 5% Acetic Acid—dispersible. Xylene—soluble. |
| E77 | Furfurylamine+propylene oxide 1:30.5, 186.6 g.+B1 23 g. | 2:1 | 1.0 | 177 | do | H₂O—insoluble. 5% Acetic Acid—dispersible. Xylene—soluble. |
| E78 | Furfurylamine+propylene oxide 1:51.8, 155 g.+B1 12.2 g. | 2:1 | 1.0 | 182 | Reddish liquid | H₂O—insoluble. 5% Acetic Acid—dispersible. Xylene—soluble. |

NOTE 1.—Obtained by reaction from 2 moles butylphenol, 2 moles formaldehyde, and 1 mole dihydroxyethyl, ethylendiamine.
NOTE 2.—Obtained by reaction from 1 mole amylphenol resin, 2 moles formaldehyde, and 2 moles diethanolamine.
*2% sodium methylate used as catalyst.
**See previous reference to this material.

Previous attention has been directed to the fact that the diglycidyl ethers may not have any bridge connecting the aromatic nuclei, or the bridge may be derived from sulfur dichloride, from an aldehyde and particularly formaldehyde, or may be the residue of a sulfonic acid, i. e., a sulfone radical. There is no advantage in using these particular compounds as far as we have been able to determine and thus our preference has been to employ compounds where the bridge is derived from a ketone and particularly acetone, due in part to commercial availability. We have attempted to prepare comparatively technically pure compounds corresponding to some previously noted and which appear for convenience again in Table V immediately following. The method of preparation, of course, is obvious in light of what has been said previously, or what has been described elsewhere in the literature.

TABLE V

| Example Number | Structure |
|---|---|
| F1 | $C_{18}H_{18}O_4$ (M. W. 298) |
| F2 | $C_{25}H_{38}O_4S$ (M. W. 470) |
| F3 | $C_{39}H_{60}O_4$ (M. W. 592) |
| F4 | $C_{18}H_{18}O_6S$ (M. W. 362) |

As has been pointed out previously, our preference is to use compounds having at least one basic nitrogen and in many cases a repetitious ether linkage obtained by oxyalkylation. The following derivatives were obtained in the same manner as described previously in connection with diglycidyl ethers where the bridge between the phenolic nuclei happened to be, in most cases, from a ketone.

TABLE VI

| Ex. No. | Reactants | Molar Ratio | Time of Reaction (hrs.) | Max. Temp., °C. | Color and Physical State | Solubility |
|---|---|---|---|---|---|---|
| G1 | Triethanolamine 149.2 g.+F1 149 g. | 2:1 | 6 | 145 | Brown semisolid | $H_2O$—insoluble. 5% Acetic Acid—soluble. Xylene—soluble. |
| G2 | Tri-isopropanolamine 94 g.+F1 74.5 g. | 2:1 | 8 | 185 | ----do---- | $H_2O$—soluble. 5% Acetic Acid—soluble. Xylene—soluble. |
| G3 | Furfurylamine 97 g.+F1 149 g. | 2:1 | 6 | 180 | Dark brown semisolid | $H_2O$—insoluble. 5% Acetic Acid—dispersible. Xylene—soluble. |
| G4 | Triethanolamine+ethylene oxide 1:18, 188.2 g.+F1 29.8 g. | 2:1 | 2 | 155 | Dark brown thick liquid | $H_2O$—soluble. 5% Acetic Acid—soluble. Xylene—soluble (cloudy). Xylene+$CH_3OH$—soluble. |
| G5 | Furfurylamine+propylene oxide 1:17.9, 113.5 g.+F1 14.9 g. | 2:1 | 2 | 170 | ----do---- | $H_2O$—insoluble. 5% Acetic Acid—soluble. Xylene—soluble. |
| G6 | Triethanolamine 74.6 g.+F2 117.5 g. | 2:1 | 5 | 140 | Dark semisolid | $H_2O$—insoluble. 5% Acetic Acid—soluble. Xylene—soluble. |
| G7 | Tri-isopropanolamine 94 g.+F2 117.5 g. | 2:1 | 6 | 165 | ----do---- | $H_2O$—insoluble. 5% Acetic Acid—soluble. Xylene—soluble. |

| Ex. No. | Reactants | Molar Ratio | Time of Reaction (hrs.) | Max. Temp., °C. | Color and Physical State | Solubility |
|---|---|---|---|---|---|---|
| G8 | Furfurylamine 97 g.+F2 235 g. | 2:1 | 6 | 170 | Dark semisolid | $H_2O$—insoluble. 5% Acetic Acid—dispersible. Xylene—soluble. |
| G9 | Triethanolamine+ethylene oxide 1:18, 188.2 g.+F2 47 g. | 2:1 | 2 | 150 | Dark thick liquid | $H_2O$—soluble. 5% Acetic Acid—soluble. Xylene—soluble (cloudy). Xylene+$CH_3OH$—soluble. |
| G10 | Furfurylamine+propylene oxide 1:17.9, 113.5 g.+F2 23.5 g. | 2:1 | 2 | 165 | do | $H_2O$—insoluble. 5% Acetic Acid—soluble. Xylene—soluble. |
| G11 | Triethanolamine 74.6 g.+F3 148 g. | 2:1 | 3 | 140 | Dark semisolid | $H_2O$—insoluble. 5% Acetic Acid—soluble. Xylene—soluble. |
| G12 | Tri-isopropanolamine 94 g.+F3 148 g. | 2:1 | 3 | 150 | do | $H_2O$—insoluble. 5% Acetic Acid—soluble. Xylene—soluble. |
| G13 | Furfurylamine 97 g.+F3 296 g. | 2:1 | 4 | 165 | do | $H_2O$—insoluble. 5% Acetic Acid—dispersible. Xylene—soluble. |
| G14 | Triethanolamine+ethylene oxide 1:18, 188.2 g.+F3 59.2 g. | 2:1 | 2 | 150 | Dark thick liquid | $H_2O$—dispersible. 5% Acetic Acid—soluble. Xylene—soluble (cloudy). Xylene+$CH_3OH$—soluble. |
| G15 | Furfurylamine+propylene oxide 1:17.9, 113.5 g.+F3 29.6 g. | 2:1 | 2 | 160 | do | $H_2O$—insoluble. 5% Acetic Acid—soluble (hot). Xylene—soluble. |
| G16 | Triethanolamine 149.2 g.+F4 181 g. | 2:1 | 6 | 150 | Dark semisolid | $H_2O$—insoluble. 5% Acetic Acid—soluble. Xylene—soluble. |
| G17 | Tri-isopropanolamine 94 g.+F4 90.5 g. | 2:1 | 7 | 180 | do | $H_2O$—insoluble. 5% Acetic Acid—soluble. Xylene—soluble. |
| G18 | Furfurylamine 97 g.+F4 181 g. | 2:1 | 6 | 180 | do | $H_2O$—insoluble. 5% Acetic Acid—dispersible. Xylene—soluble. |
| G19 | Triethanolamine+ethylene oxide 1:18, 188.2 g.+F4 36.2 g. | 2:1 | 2 | 160 | Dark thick liquid | $H_2O$—soluble. 5% Acetic Acid—soluble. Xylene—soluble (cloudy). Xylene+$CH_3OH$—soluble. |
| G20 | Furfurylamine+propylene oxide 1:17.9, 113.5 g.+F4 18.1 g. | 2:1 | 2 | 165 | do | $H_2O$—insoluble. 5% Acetic Acid—soluble. Xylene—soluble. |

For reasons which are obvious in light of what has been said previously, the majority of examples, in fact all prior examples, are concerned with instances where the ratio of the amine reactant to the polyepoxide is two-to-one. One reason is that the epoxide is usually the most expensive reactant and, everything else being equal, one attempts to obtain the best results with the least amount of the more, or most expensive, reactant. This ratio need not be employed. Other obvious ratios can be used; for instance, one may use a ratio of one-to-one, provided, of course, that the amine preferably has at least two reactive hydrogen atoms. If the amine does not have at least two reactive hydrogen atoms, one mole of the epoxide may react and make available a new labile hydrogen atom which is then susceptible to further reaction. On the other hand, if the amine reactant has two or more labile hydrogen atoms then it becomes evident that one produces not only a linear type polymer but also that cross-linking may take place between two linear polymers so as to produce an insoluble, or semi-insoluble mass suggestive of gelation or incipient thermosetting action, or one may even obtain a hard type of resin suitable only for purposes other than those herein described and perhaps be useless for any purpose.

Note in the table following, i. e., Table VII, the materials obtained in the manner described in this table use a molal ratio of one-to-one. The reaction masses become semi-resinous and give solutions which usually are either almost insoluble in water, or are dispersible to a modest degree at least, but which are somewhat more dispersible in dilute acid. They are also soluble or dispersible as a rule in xylene or a mixture of xylene and methyl alcohol (one-to-one). The products obtained were comparatively thick liquids and indicated that the molecular size was considerably higher in proportion than comparable compounds obtained by the two-to-one ratio. Such materials tend in the direction of potential insolubility and are particularly desirable for the reason that they adsorb rapidly at the interface. Likewise, when converted into new compounds by oxyethylation, oxypropylation, acylation, or similar processes, the resultant of reaction has these same properties to an equal or greater degree.

TABLE VII

| Ex. No. | Reactants | Molar Ratio | Time of Reaction (hrs.) | Max. Temp., °C. | Color and Physical State | Solubility |
|---|---|---|---|---|---|---|
| H1 | Triethanolamine+propylene oxide 1:18, 119.3 g.+3A 34 g. | 1:1 | 1.5 | 150 | Yellow thick liquid | $H_2O$—insoluble. 5% Acetic Acid—dispersible. Xylene+$CH_3OH$—dispersible. |
| H2 | Furfurylamine+propylene oxide 1:51.8, 155 g.+3A 17 g. | 1:1 | 1.0 | 150 | Brown thick liquid | $H_2O$—insoluble. 5% Acetic Acid—dispersible. Xylene+$CH_3OH$—dispersible. |
| H3 | Furfurylamine+propylene oxide 1:66.8, 199 g.+3A 17 g. | 1:1 | 2.0 | 165 | Yellow thick liquid | $H_2O$—insoluble. 5% Acetic Acid—dispersible. Xylene+$CH_3OH$—dispersible. |
| H4 | Furfurylamine+ethylene oxide+propylene oxide 1:15.5:9, 130 g.+3A 34 g. | 1:1 | 2.0 | 90 | Dark liquid | $H_2O$—dispersible. 5% Acetic Acid—soluble. Xylene+$CH_3OH$—soluble. |
| H5 | Triethylene tetramine+propylene oxide 1:12, 41.3 g.+3A 17 g. | 1:1 | 1.0 | 115 | Brownish thick liquid | $H_2O$—insoluble. 5% Acetic Acid—dispersible. Xylene+$CH_3OH$—soluble. |
| H6 | Propylene-diamine+propylene oxide 1:10.3, 67 g.+3A 34 g. | 1:1 | 1.5 | 135 | Yellow thick liquid | $H_2O$—insoluble. 5% Acetic Acid—dispersible. Xylene+$CH_3OH$—soluble. |

| Ex. No. | Reactants | Molar Ratio | Time of Reaction (hrs.) | Max. Temp., °C. | Color and Physical State | Solubility |
|---|---|---|---|---|---|---|
| H7 | meta-phenylene diamine+propylene oxide 1:27.6, 85.4 g.+3A 17 g. | 1:1 | 1.5 | 120 | Dark brown thick liquid | H₂O—insoluble. 5% Acetic Acid—dispersible. Xylene+CH₃OH—soluble. |
| H8 | Diethylene triamine+propylene oxide 1:18.7, 59.4 g.+3A 17 g. | 1:1 | 1.5 | 130 | Brown thick liquid | H₂O—insoluble. 5% Acetic Acid—dispersible. Xylene+CH₃OH—soluble. |
| H9 | Furfurylamine+ethylene oxide+propylene oxide 1:15.5:11.3, 143.4 g.+3A 34 g. | 1:1 | .5 | 100 | ___do___ | H₂O—dispersible. 5% Acetic Acid—soluble. Xylene—soluble. |
| H10 | Furfurylamine+ethylene oxide+propylene oxide 1:15.5:16.4, 173 g.+3A 34 g. | 1:1 | 1 | 100 | ___do___ | H₂O—dispersible. 5% Acetic Acid—soluble. Xylene—soluble. |
| H11 | Furfurylamine+ethylene oxide+propylene oxide 1:15.5:23.5, 214.2 g.+3A 34 g. | 1:1 | 1 | 100 | ___do___ | H₂O—dispersible. 5% Acetic Acid—doluble. Xylene—soluble. |
| H12 | Furfurylamine+ethylene oxide+propylene oxide 1:15.5:32.2, 264.6 g.+3A 34 g. | 1:1 | 1 | 100 | ___do___ | H₂O—dispersible. 5% Acetic Acid—soluble. Xylene—soluble. |

PART 6

In practicing the present process, the treating or demulsifying agent is used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

In many instances the products herein specified as demulsifiers can be conveniently used without dilution. However, they may be diluted as desired with any suitable solvent. For instance, by mixing 75 parts by weight of the product of Example E43 with 15 parts by weight of xylene and 10 parts by weight of isopropyl alcohol, an excellent demulsifier is obtained. Selection of the solvent will vary, depending upon the solubility characteristics of the product, and of course will be dictated in part by economic considerations, i. e., cost.

As noted above, the products herein described may be used not only in diluted form, but also may be used admixed with some other chemical demulsifier. A mixture which illustrates such combination is the following:

The product of Example E43, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

Having thus described our invention, what we claim as new and desire to secure by Letters Patent, is:

1. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound containing at least one active hydrogen atom, and (B) a phenolic polyepoxide free from reactive functional groups other than epoxy and hydroxyl groups and co-generically associated compounds formed in the preparation of said polyepoxides; said epoxides being monomers and low molal polymers not exceeding the tetramers; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehyde oxygen atom, the divalent radical

the divalent

radical, the divalent sulfone radical, and the divalent monosulfide radical —S—, the divalent radical

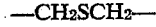

and the divalent disulfide radical —S—S—; said phenolic portion of the diepoxide being obtained from a phenol of the structure

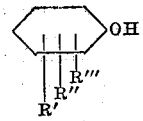

in which R', R'', and R''' represent a member of the class consisting of hydrogen and hydrocarbon substituents of the aromatic nucleus, said substituent member having not over 18 carbon atoms; with the further proviso that said reactive compounds (A) and (B) be members of the class consisting of non-thermosetting organic solvent-soluble liquids and low-melting solids; with the final proviso that the reaction product be a member of the class of oxyalkylation and acylation-susceptible solvent-soluble liquids and low-melting solids; and said reaction between (A) and (B) being conducted below the pyrolytic point of the reactants and the resultants of reaction.

2. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound containing at least one active hydrogen atom, and (B) phenolic epoxides being principally polyepoxides, including particularly phenolic diepoxides; said epoxides being free from reactive functional groups other than epoxy and hydroxyl groups, and including additionally cogenerically associated compounds formed in the preparation of said polyepoxides and particularly diepoxides; said epoxides being monomers and low molal polymers not exceeding the tetramer; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

and the divalent disulfide radical —S—S—; said phenolic portion of the diepoxide being obtained from a phenol of the structure

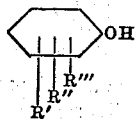

in which R', and R", and R''' represent a member of the class consising of hydrogen and hydrocarbon substituents of the aromatic nucleus, said substituent member having not over 18 carbon atoms; with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

3. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound containing at least one active hydrogen atom, and (B) a phenolic diepoxide free from reactive functional groups other than epoxy and hydroxyl groups, and cogenerically associated compounds formed in the preparation of said diepoxides; said epoxides being monomers and low molal polymers not exceeding the tetramers; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

and the divalent disulfide radical —S—S—; said phenolic portion of the diepoxide being obtained from a phenol of the structure

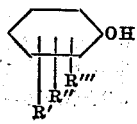

in which R', R", and R''' represent a member of the class consisting of hydrogen and hydrocarbon substituents of the aromatic nucleus, said substituent member having not over 18 carbon atoms; with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

4. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound containing at least one active hydrogen atom, and (B) a phenolic diepoxide free from reactive functional groups other than epoxy and hydroxyl groups, and cogenerically associated compounds formed in the preparation of said diepoxides; said epoxides being monomers and low molal polymers not exceeding the tetramers; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

and the divalent disulfide radical —S—S—; said phenolic portion of the diepoxide being obtained from a phenol of the structure

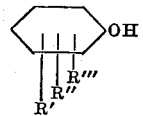

in which R', and R", and R''' represent a member of the class consisting of hydrogen and hydrocarbon substitutents of the aromatic nucleus, said substituent member having not over 18 carbon atoms; the ratio of reactant (A) to reactant (B) being at least sufficient so there is available at least one active hydrogen in (A) for each oxirane ring in the diepoxide reactant (B); with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

5. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound containing at least one active hydrogen atom, and (B) a phenolic diepoxide free from reactive functional groups other than epoxy and hydroxyl groups, and cogenerically associated compounds formed in the preparation of said diepoxides, including monoepoxides; said cogenerically associated compounds containing an average of more than one epoxide group per molecule; said epoxides being monomers and low molal polymers not exceeding the tetramers; said epoxides being selected from the class consisting of (a) compounds where the phenolic nuclei are directly joined without an intervening bridge radical, and (b) compounds containing a radical in which two phenolic nuclei are joined by a divalent radical selected from the class consisting of ketone residues formed by the elimination of the ketonic oxygen atom, and aldehyde residues obtained by the elimination of the aldehydic oxygen atom, the divalent radical

the divalent

radical, the divalent sulfone radical, and the divalent monosulfide radical —S—, the divalent radical

and the divalent disulfide radical —S—S—; said phenolic portion of the diepoxide being obtained from a phenol of the structure

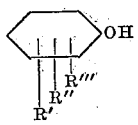

in which R', and R", and R''' represent a member of the class consisting of hydrogen and hydrocarbon substituents of the aromatic nucleus, said substituent member having not over 18 carbon atoms; the ratio of reactant (A) to reactant (B) being at least sufficient so there is available at least one active hydrogen in (A) for each oxirane ring in the diepoxide reactant (B); with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

6. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound containing at least one active hydrogen atom, and (B) a member of the class consisting of (1) compounds of the following formula

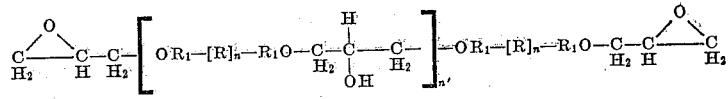

in which R represents a divalent radical selected from the class consisting of ketone residues formed by the elimination of the ketonic oxygen atom and aldehyde residues obtained by the elimination of the aldehydic oxygen atom, the divalent radical

the divalent

radical, the sulfone radical, and the divalent monosulfide radical —S—, the divalent radical —CH₂SCH₂—, and the divalent disulfide radical —S—S—; and R₁O is the divalent radical obtained by the elimination of a hydroxyl hydrogen atom and a nuclear hydrogen atom from the phenol

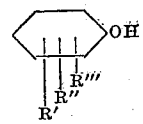

in which R', and R", and R''' represent a member of the class consisting of hydrogen and hydrocarbon substitutents of the aromatic nucleus, said substituent member having not over 18 carbon atoms; the ratio of reactant (A) to reactant (B) being at least sufficient so there is available at least one active hydrogen in (A) for each oxirane ring in the diepoxide reactant (B); n represents an integer selected from the class of zero and 1, and n' represents a whole number not greater than 3 including zero; and (2) cogenerically associated compounds formed in the preparation of (1) preceding, including monoepoxides; with the further proviso that said reactive compounds (A) and (B) be members of the class consisting of non-thermosetting organic solvent-soluble liquids and low melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

7. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound having at least one basic amino nitrogen atom and containing at least one active hydrogen atom, and (B) a member of the class consisting of (1) compounds of the following formula

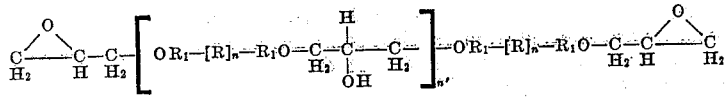

in which R represents a divalent radical selected from the class consisting of ketone residues formed by the elimination of the ketonic oxygen atom and aldehyde residues obtained by the elimination of the aldehydic oxygen atom, the divalent radical

the divalent

radical, the divalent sulfone radical, and the divalent mono-sulfide radical —S—, the divalent radical

and the divalent disulfide radical —S—S—; and R₁O is the divalent radical obtained by the elimination of a hydroxyl hydrogen atom and a nuclear hydrogen atom from the phenol

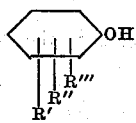

in which R′, R″, and R‴ represent a member of the class consisting of hydrogen and hydrocarbon substituents of the aromatic nucleus, said substituent member having not over 18 carbon atoms; the ratio of reactant (A) to reactant (B) being at least sufficient so there is available at least one active hydrogen in (A) for each oxirane ring in the diepoxide reactant (B); n represents an integer selected from the class of zero and 1, and n′ represents a whole number not greater than 3 including zero; and (2) cogenerically associated compounds formed in the preparation of (1) preceding, including monoepoxides; with the further proviso that said reactive compounds (A) and (B) be members of the class consisting of non-thermosetting organic solvent-soluble liquids and low melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

8. A process for breaking petroleum emulsions of the water-in-water type characterized by subjecting the emulsion to the action of a demulsifier including synthetic hydrophile products; said synthetic hydrophile products being the reaction product of (A) a monomeric non-resinous nitrogen-containing compound having at least one basic nitrogen atom and containing at least one active hydrogen atom, and (B) a member of the class consisting of (1) compounds of the following formula:

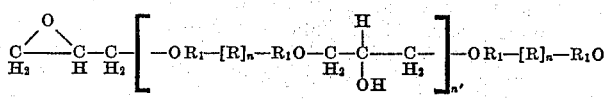

in which R represents a divalent radical selected from the class consisting of ketone residues formed by the elimination of the ketonic oxygen atom and aldehyde residues obtained by the elimination of the aldehyde oxygen atom, the divalent radical

the divalent

radical, the divalent sulfone radical, and the divalent monosulfide radical —S—, the divalent radical

—CH₂SCH₂— and the divalent disulfide radical —S—S—; and R₁O is the divalent radical obtained by the elimination of a hydroxyl hydrogen atom and a nuclear hydrogen atom from the phenol

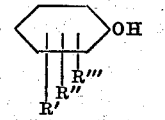

in which R′, R″, and R‴ represent a member of the class consisting of hydrogen and hydrocarbon substituents of the aromatic nucleus, said substituent member having not over 18 carbon atoms; the ratio of reactant (A) to reactant (B) being at least one active hydrogen in (A) for each oxirane ring in the diepoxide reactant (B); n represents an integer selected from the class of zero and 1, and n′ represents a whole number not greater than 3 including zero; and (2) cogenerically associated compounds formed in the preparation of (1) preceding, including monoepoxides; with the proviso that in (B) there be present at least a significant amount of the monomer as distinguished from other cogeners; with the further proviso that said reactive compounds (A) and (B) be members of the class consisting of non-thermosetting organic solvent-soluble liquids and low melting solids; with the final proviso that the reaction product be a member of the class of oxyalkylation- and acylation-susceptible solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the results of reaction.

9. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound having at least one basic nitrogen atom and containing at least one active hydrogen atom, and (B) a member of the class consisting of (1) compounds of the following formula:

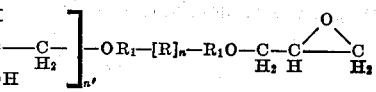

in which R represents a divalent radical selected from the class consisting of ketone residues formed by the elimination of the ketonic oxygen atom and aldehyde residues obtained by the elimination of the aldehydic oxygen atom, the divalent radical

the divalent

radical, the divalent sulfone radical, and the divalent monosulfide radical —S—, the divalent radical

—CH₂SCH₂— and the divalent radical obtained by the elimination of a hydroxyl hydrogen atom and a nuclear hydrogen atom from the phenol

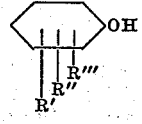

in which R', R", and R''' represent a member of the class consisting of hydrogen and hydrocarbon substituents of the aromatic nucleus, said substituent member having not over 18 carbon atoms; the ratio of reactant (A) to reactant (B) being at least sufficient so there is available at least one active hydrogen in (A) for each oxirane ring in the diepoxide reactant (B); $n$ represents an integer selected from the class of zero and 1, and $n'$ represents a whole number not greater than 3 including zero; and (2) cogenerically associated compounds formed in the preparation of (1) preceding, including monoepoxides; with the proviso that the composition of (B) include at least a major part of the monomer as distinguished from other cogeners; with the further proviso that said reactive compounds (A) and (B) be members of the class consisting of non-thermosetting organic solvent-soluble liquids and low melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the results of reaction.

10. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound having at least one basic nitrogen atom and containing at least one active hydrogen atom, and (B) a member of the class consisting of (1) compounds of the following formula:

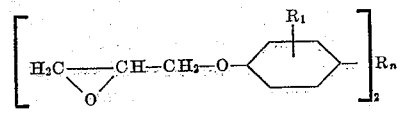

in which R represents a divalent radical selected from the class consisting of ketone residues formed by the elimination of the ketonic oxygen atom and aldehyde residues obtained by the elimination of the aldehydic oxygen atom, the divalent radical

the divalent

radical, the divalent sulfone radical, and the divalent monosulfide radical —S—, the divalent radical

—CH$_2$SCH$_2$— and the divalent disulfide radical —S—S—; and R$_1$O is the divalent radical obtained by the elimination of a hydroxyl hydrogen atom and a nuclear hydrogen atom from the phenol

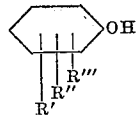

in which R', and R", and R''' represent a member of the class consisting of hydrogen and hydrocarbon substituents of the aromatic nucleus, said substituent member having not over 18 carbon atoms; the ratio of reaction (A) to reactant (B) being at least sufficient so there is available at least one active hydrogen in (A) for each oxirane ring in the diepoxide reactant (B); $n$ represents an integer selected from the class of zero and 1, and $n'$ represents a whole number not greater than 3 including zero; and (2) cogenerically associated compounds formed in the preparation of (1) preceding, including monoepoxides; with the proviso that (B) consist principally of the monomer as distinguished from other cogeners; with the further proviso that said reactive compounds (A) and (B) be members of the class consisting of non-thermosetting organic solvent-soluble liquids and low melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

11. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound having at least one basic nitrogen atom and containing at least one active hydrogen atom, and (B) a member of the class consisting of (1) compounds of the following formula:

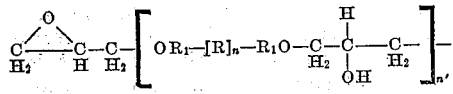

wherein R is essentially an aliphatic hydrocarbon bridge, $n$ has one of the values 0 to 1, and R$_1$ is an alkyl radical containing from 1 to 4 carbon atoms, and (2) cogenerically associated compounds formed in the preparation of (1) preceding, including monoepoxides; with the proviso that (B) consist principally of the monomer as distinguished from other cogeners; the ratio of reactant (A) to reactant (B) being at least sufficient so there is available at least one active hydrogen in (A) for each oxirane ring in the diepoxide reactant (B); with the further proviso that said reactive compounds (A) to (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

12. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-consisting compound having at least one basic nitrogen atom and containing at least one active hydrogen atom, and (B) a member of the class consisting of (1) compounds of the following formula:

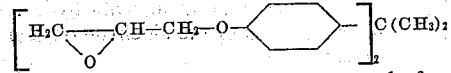

and (2) cogenerically associated compounds formed in the preparation of (1) preceding, including monoepoxides; with the proviso that (B) consist principally of the monomer as distinguished from other cogeners; the ratio of reactant (A) to reactant (B) being at least sufficient so there is available at least one active hydrogen in (A) for each oxirane ring in the diepoxide reactant (B); with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

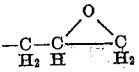

13. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound having at least one basic nitrogen atom and containing at least one active hydrogen atom, and (B) a member of the class consisting of (1) compounds of the following formula:

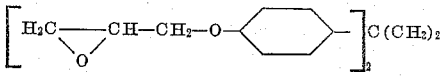

and (2) cogenerically associated compounds formed in the preparation of (1) preceding, including monoepoxides, with the proviso that (B) consist principally of the monomer as distinguished from other cogeners; the ratio of reactant (A) to reactant (B) being in the proportion of the two moles of (A) to one mole of (B); with the further proviso that said reactive compounds (A) and (B) be members of the class consisting of non-thermosetting organic solvent-soluble liquids and low-melting solids; with the final proviso that the reaction product be a member of the class of oxyalkylation- and acylation-susceptible solvent-soluble liquids and low-melting solids; and said reaction between (A) and (B) being conducted below the pyrolytic point of the reactants and the resultants of reaction.

14. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound having at least one basic nitrogen atom and containing at least one active hydrogen atom, and (B) a member of the class consisting of (1) compounds of the following formula

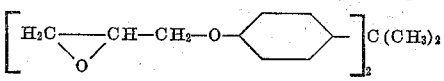

and (2) cogenerically associated compounds formed in the preparation of (1) preceding, including monoepoxides; with the proviso that (B) consist principally of the monomer as distinguished from other cogeners; the ratio of reactant (A) to reactant (B) being in the proportion of two moles of (A) to one mole of (B); with the further proviso that said reactive compounds (A) and (B) be members of the class consisting of non thermosetting organic solvent-soluble liquids and low-melting solids; with the further proviso that the reaction product be a member of the class of oxyalkylation- and acylation-susceptible solvent-soluble liquids and low-melting solids; with the final proviso that the reaction product be at least incipiently self-dispersible in dilute aqueous concentration; and said reaction between (A) and (B) being conducted below the pyrolytic point of the reactants and the resultants of reaction.

15. A process for breaking petroleum emulsions of the water-in-oil type characterized by subjecting the emulsion to the action of a demulsifier including synthetic hydrophile products; said synthetic hydrophile products being the reaction product of (A) a monomeric non-resinous nitrogen-containing compound having at least one basic nitrogen atom and containing at least one active hydrogen atom, and (B) a member of the class consisting of (1) compounds of the following formula

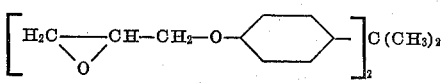

and (2) cogenerically associated compounds formed in the preparation of (1) preceding, including monoepoxides; with the proviso that (B) consist principally of the monomer as distinguished from other cogeners; the ratio of reaction (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the further proviso that the reaction product be a member of the class of oxyalkylation- and acylation-susceptible solvent-soluble liquids and low-melting solids; with the final proviso that the reaction product be at least incipiently self-dispersible in dilute acidic aqueous concentration; and said reaction between (A) and (B) being conducted below the pyrolytic point of the reactants and the resultants of reaction.

16. A process for breaking petroleum emulsions of the water-in-oil type characterized by subjecting the emulsion to the action of a demulsifier including synthetic hydrophile products; said synthetic hydrophile products being the reaction product of (A) triethanolamine which has been reacted with at least 3 moles and not more than 36 moles of propylene oxide, and (B) a member of the class consisting of (1) compounds of the following formula

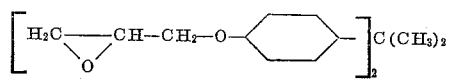

and (2) cogenerically associated compounds formed in the preparation of (1) preceding, including monoepoxides; with the proviso that (B) consist principally of the monomer as distinguished from other cogeners; the ratio of reaction (A) to reactant (B) being in the proportion of two moles of (A) to one mole of (B); with the further proviso that said reactive compounds (A) and (B) be members of the class consisting of non-thermosetting organic solvent-soluble liquids and low-melting solids; with the further proviso that the reaction product be a member of the class of oxyalkylation- and acylation-susceptible solvent-soluble liquids and low-melting solids; with the final proviso that the reaction product be at least incipiently self-dispersible in dilute acidic aqueous concentration; and said reaction between (A) and (B) being conducted below the pyrolytic point of the reactants and the resultants of reaction.

17. A process for breaking petroleum emulsions of the water-in-oil type characterized by subjecting the emulsion to the action of a demulsifier including synthetic hydrophile products; said synthetic hydrophile products being the reaction product of (A) triethanolamine which has been reacted with 18 moles of propylene oxide, and (B) a member of the class consisting of (1) compounds of the following formula

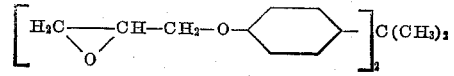

and (2) cogenerically associated compounds formed in the preparation of (1) preceding, including monoepoxides; with the proviso that (B) consist principally of the monomer as distinguished from other cogeners; the ratio of reaction (A) to reactants (B) being in the proportion of two moles of (A) to one mole of (B); with the further proviso that said reactive compounds (A) and (B) be members of the class consisting of non-thermosetting organic solvent-soluble liquids and low-melting solids; with the further proviso that the reaction product be a member of the class of oxyalkylation- and acylation-susceptible solvent-soluble liquids and low-melting solids; with the final proviso that the reaction product be at least incipiently self-dispersible in dilute acidic aqueous concentration; and said reaction between (A) and (B) being conducted below the pyrolytic point of the reactants and the resultants of reaction.

References Cited in the file of this patent

UNITED STATES PATENTS

| | | |
|---|---|---|
| 2,233,383 | De Groote et al. | Feb. 25, 1941 |
| 2,423,643 | Ericks | July 8, 1947 |